US012753273B2

(12) United States Patent
Ponder et al.

(10) Patent No.: US 12,753,273 B2
(45) Date of Patent: Oct. 6, 2026

(54) CONDUCTIVE POLYMER MATERIALS AND METHODS OF MAKING THE SAME

(71) Applicant: Georgia Tech Research Corporation, Atlanta, GA (US)

(72) Inventors: James F. Ponder, Atlanta, GA (US); Shawn Alan Gregory, Atlanta, GA (US); Akanksha Menon, Atlanta, GA (US); John Robert Reynolds, Atlanta, GA (US); Shannon Yee, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 278 days.

(21) Appl. No.: 18/277,240

(22) PCT Filed: Mar. 31, 2022

(86) PCT No.: PCT/US2022/022815
§ 371 (c)(1),
(2) Date: Aug. 15, 2023

(87) PCT Pub. No.: WO2022/235357
PCT Pub. Date: Nov. 10, 2022

(65) Prior Publication Data

US 2025/0277083 A1 Sep. 4, 2025

Related U.S. Application Data

(60) Provisional application No. 63/168,427, filed on Mar. 31, 2021.

(51) Int. Cl.
*C08G 61/12* (2006.01)
*H01B 1/12* (2006.01)

(52) U.S. Cl.
CPC .......... *C08G 61/126* (2013.01); *H01B 1/124* (2013.01); *C08G 2261/1422* (2013.01); *C08G 2261/1424* (2013.01); *C08G 2261/80* (2013.01)

(58) Field of Classification Search
CPC . H01B 1/00; H01B 1/124–128; C08G 61/126
See application file for complete search history.

(56) References Cited

U.S. PATENT DOCUMENTS 6,130,339 A 10/2000 Tan et al.
7,056,600 B2 * 6/2006 Andriessen ............ H01G 11/56 428/917

(Continued)

FOREIGN PATENT DOCUMENTS

EP 2305685 A1 * 4/2011 ............ H01B 1/127
WO 2006/084088 A1 8/2006
WO 2007/087587 A2 8/2007

OTHER PUBLICATIONS

Lakshmanan et al "Fabrication of fast switching electrochromic window based on poly(3,4-(2,2-dimethylpropylenedioxy)thiophene) thin film", J Mater Sci: Mater Electron DOI 10.1007/s10854-016-4527-0 Published online: Feb. 18, 2016.*

(Continued)

*Primary Examiner* — Mark Kopec
(74) *Attorney, Agent, or Firm* — TROUTMAN PEPPER LOCKE LLP; Ryan A. Schneider; Grant D. Marshall

(57) ABSTRACT

Disclosed herein are methods of making a conductive polymer material, the method comprising: casting, on a substrate, a functionalized polymer solution comprising a conductive backbone of conjugated monomer units and a plurality of nonconductive side chains; and cleaving the plurality of nonconductive side chains off of the conductive backbone to form the conductive polymer material, the conductive polymer material being insoluble in at least one (Continued)

solvent, wherein the conductive backbone in the conductive polymer material comprises conjugated monomer units substituted with a hydroxymethyl substituent. Also disclosed herein are conductive polymer materials made by the same and conductive films comprising the same.

10 Claims, 16 Drawing Sheets

(56) References Cited

U.S. PATENT DOCUMENTS

| | | | | |
|---|---|---|---|---|
| 7,333,257 | B2 * | 2/2008 | Reynolds | G02F 1/155<br>359/266 |
| 2008/0087887 | A1 | 4/2008 | Cho et al. | |
| 2010/0266897 | A1 | 10/2010 | Lee et al. | |
| 2012/0152273 | A1 | 6/2012 | Kergosien et al. | |
| 2017/0197836 | A1 | 7/2017 | Nonoguchi et al. | |

OTHER PUBLICATIONS

Ocampo et al "Copolymers of 3,4-Ethylenedioxythiophene and 3-Methylthiophene: Properties, Applications and Morphologies", Macromol. Mater. Eng. 2007, 292, 85-94.*

Ponder et al "Designing a Soluble PEDOT Analogue without Surfactants or Dispersants", Macromolecules 2016, 49, 2106-2111, DOI: 10.1021/acs.macromol.5b02638.*

DTIC Defense Technical Information Center Report (pub Mar. 16, 2015) Title: "Optimized Electroactive Polymer Supercapacitors", Reynolds et al., Georgia Tech Research Corp. (14 pages).*

International Search Report and Written Opinion from Application No. PCT/US2022/022815 dated Nov. 23, 2022.

King, et al., "Extremely Tough Composites from Fabric Reinforced Polyampholyte Hydrogels," Material Horizons Aug. 10, 2016, vol. 2, No. 6pp. 584-591.

* cited by examiner

ProDOT(BOE)-DMP
P(BOE)-D

P(BOE)-D

P(OH)-D

P(EtHx)

P(EtHx)-D

P(OE3)-D

P(OH)-D

P(HDE)-E

P(OH)-E

P(ODE)-E2

P(OH)-E2

CONDUCTIVE POLYMER MATERIALS AND METHODS OF MAKING THE SAME

CROSS-REFERENCE TO RELATED APPLICATIONS

This application claims the benefit of U.S. Provisional Application Ser. No. 63/168,427, filed on 31 Mar. 2021, the entire contents and substance of which is incorporated herein by reference in its entirety as if fully set forth below.

STATEMENT OF RIGHTS UNDER FEDERALLY SPONSORED RESEARCH

This invention was made with government support under Grant No. N00014-19-1-2162 awarded by the Office of Naval Research. The government has certain rights in the invention.

FIELD OF THE DISCLOSURE

The present disclosure relates generally to conductive polymer materials and methods. Particularly, embodiments of the present disclosure relate to insoluble conductive polymer materials formed from soluble functionalized polymer solutions.

BACKGROUND

The development of electroactive conjugated polymers has become increasingly important due to their potential use in optical, electrochemical, and semiconductor devices. While the structure of the π-conjugated backbone can be responsible for imparting the core optoelectronic and electrochemical functionality of the polymer, side chains appended to the backbone for solubility and processability can play a significant role in tuning these properties. Specifically, side chains can influence the doping mechanism and efficiency, long range order and polymer packing, and morphology of polymer/discrete molecular blends. However, in order to solubilize the polymer backbones, the side chains must be relatively long and/or branched, typically with chiral centers, to induce many degrees of conformational freedom.

While a select few systems (e.g., PBTTT and some regioregular poly(3-alkylthiophenes)) show high electrical conductivity due to induced long-range order resulting from linear side chains of optimized length and processing conditions, these are rare exceptions. Generally, such side chains can reduce the relative fraction of active material in the film, adversely affect π-π intermolecular interactions, and compromise many of the desirable properties of the material, including electrical conductivity. In fact, many conjugated polymers are more than 50% side chains by mass. At the same time, vapor deposited or electropolymerized materials (e.g., PEDOT or polypyrrole) typically can have small or no side chains and often out-perform solubilized analogues in terms of charge transport, but these materials are insoluble and therefore not solution-processable.

What is needed, therefore, are solution-processable polymer materials that can form insoluble conductive polymer materials while retaining electrical conductivity. Embodiments of the present disclosure address this need as well as other needs that will become apparent upon reading the description below in conjunction with the drawings.

BRIEF SUMMARY OF THE DISCLOSURE

The present disclosure relates generally to conductive polymer materials and methods. Particularly, embodiments of the present disclosure relate to insoluble conductive polymer materials formed from soluble functionalized polymer solutions.

An exemplary embodiment of the present disclosure can provide a conductive polymer (D)n material comprising a plurality of conjugated electron donor monomer units substituted with a hydroxymethyl substituent with n=10 to 10,000 units wherein the polymer (D) n material is insoluble in at least one solvent, and the conductive polymer (D)n material has a conductivity from 10 S/cm to 100,000 S/cm.

In any of the embodiments disclosed herein, the electron donor monomer units can comprise dioxyheterocycles.

In any of the embodiments disclosed herein, the electron donor monomer units can have the structure of:

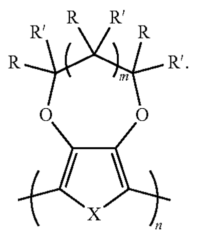

In any of the embodiments disclosed herein, X can be S, O, Se, NR, or NR'; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the electron donor monomer units can have the structure of:

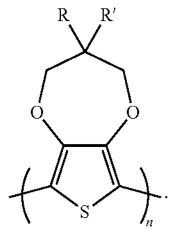

In any of the embodiments disclosed herein, R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; and n can be from 10 to 10,000.

In any of the embodiments disclosed herein, the electron donor monomer units can have the structure of:

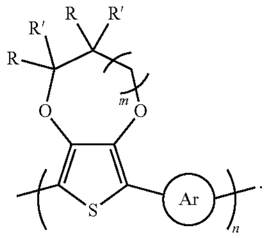

In any of the embodiments disclosed herein, Ar can be any aryl, benzyl, or alkylaryl; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the electron donor monomer units can have the structure of:

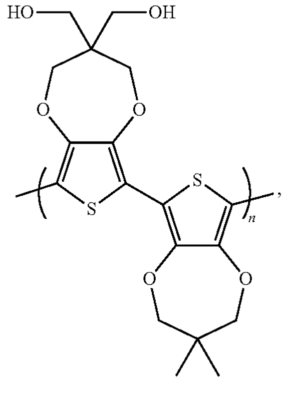

wherein n is from 10 to 10,000.

The present disclosure can also provide a conductive film material comprising the conductive polymer (D)n material of any of the embodiments disclosed herein.

The present disclosure can also provide a conductive polymer (A)n material comprising a plurality of conjugated electron acceptor monomer units substituted with a hydroxymethyl substituent, with n=10 to 10,000 units wherein the conductive polymer (A)n material is insoluble in at least one solvent and the conductive polymer (A)n material exhibits a conductivity from 10 S/cm to 100,000 S/cm.

In any of the embodiments disclosed herein, the electron acceptor monomer units have the structure of:

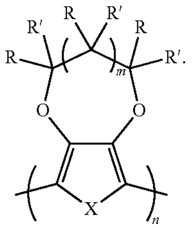

In any of the embodiments disclosed herein, X can be S, O, Se, NR, or NR'; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the electron acceptor monomer units have the structure of:

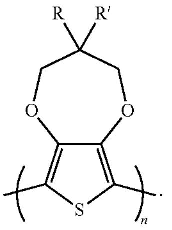

In any of the embodiments disclosed herein, R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; and n can be from 10 to 10,000.

In any of the embodiments disclosed herein, the electron acceptor monomer units have the structure of:

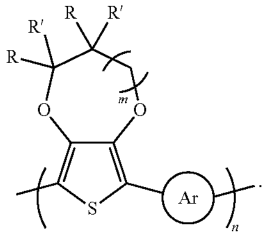

In any of the embodiments disclosed herein, Ar can be any aryl, benzyl, or alkylaryl; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the electron acceptor monomer units can have the structure of:

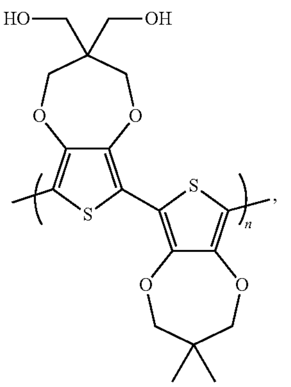

wherein n is from 10 to 10,000.

The present disclosure can also provide a conductive film material comprising the conductive polymer (A)n material of any of the embodiments disclosed herein.

The present disclosure can also provide a method of making a conductive polymer material, the method comprising: casting, on a substrate, a functionalized polymer solution comprising a conductive backbone of conjugated monomer units and a plurality of nonconductive side chains; and cleaving the plurality of nonconductive side chains off of the conductive backbone to form the conductive polymer material, the conductive polymer material being insoluble in at least one solvent, wherein the conductive backbone in the conductive polymer material comprises conjugated monomer units substituted with a hydroxymethyl substituent.

In any of the embodiments disclosed herein, cleaving the plurality of nonconductive side chains can comprise a hydrolysis reaction, thermal cleavage, or a photocleavage reaction.

In any of the embodiments disclosed herein, the plurality of nonconductive side chains can comprise ester functional groups.

In any of the embodiments disclosed herein, the conductive polymer material can further comprise a plurality of alcohol functional groups bonded to the conductive backbone.

In any of the embodiments disclosed herein, cleaving the plurality of nonconductive side chains can further comprise volumetrically contracting the conductive polymer material.

In any of the embodiments disclosed herein, the conductive polymer material can have a conductivity from 10 S/cm to 100,000 S/cm.

In any of the embodiments disclosed herein, the Seebeck coefficient of the conductive polymer material can be decreased when compared to the Seebeck coefficient of the functionalized polymer solution on the substrate.

In any of the embodiments disclosed herein, the conjugated monomer units in the conductive polymer material can comprise dioxyheterocycles.

In any of the embodiments disclosed herein, the conjugated monomer units in the conductive backbone can have the structure of:

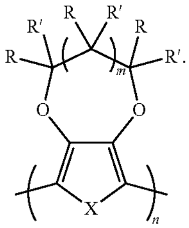

In any of the embodiments disclosed herein, X can be S, O, Se, NR, or NR'; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the conjugated monomer units in the conductive backbone can have the structure of:

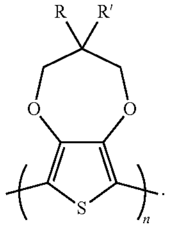

In any of the embodiments disclosed herein, R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; and n can be from 10 to 10,000.

In any of the embodiments disclosed herein, the conjugated monomer units in the conductive backbone can have the structure of:

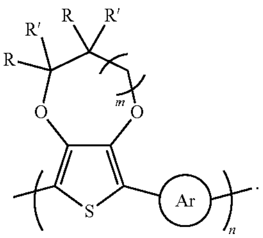

In any of the embodiments disclosed herein, Ar can be any aryl, benzyl, or alkylaryl; R can be H, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

In any of the embodiments disclosed herein, the conjugated monomer units in the conductive backbone have the structure of:

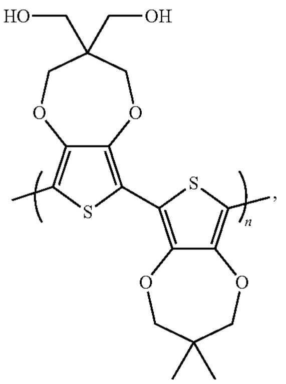

wherein n is from 10 to 10,000.

Also disclosed herein are conductive films formed by the method of any of the embodiments disclosed herein.

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
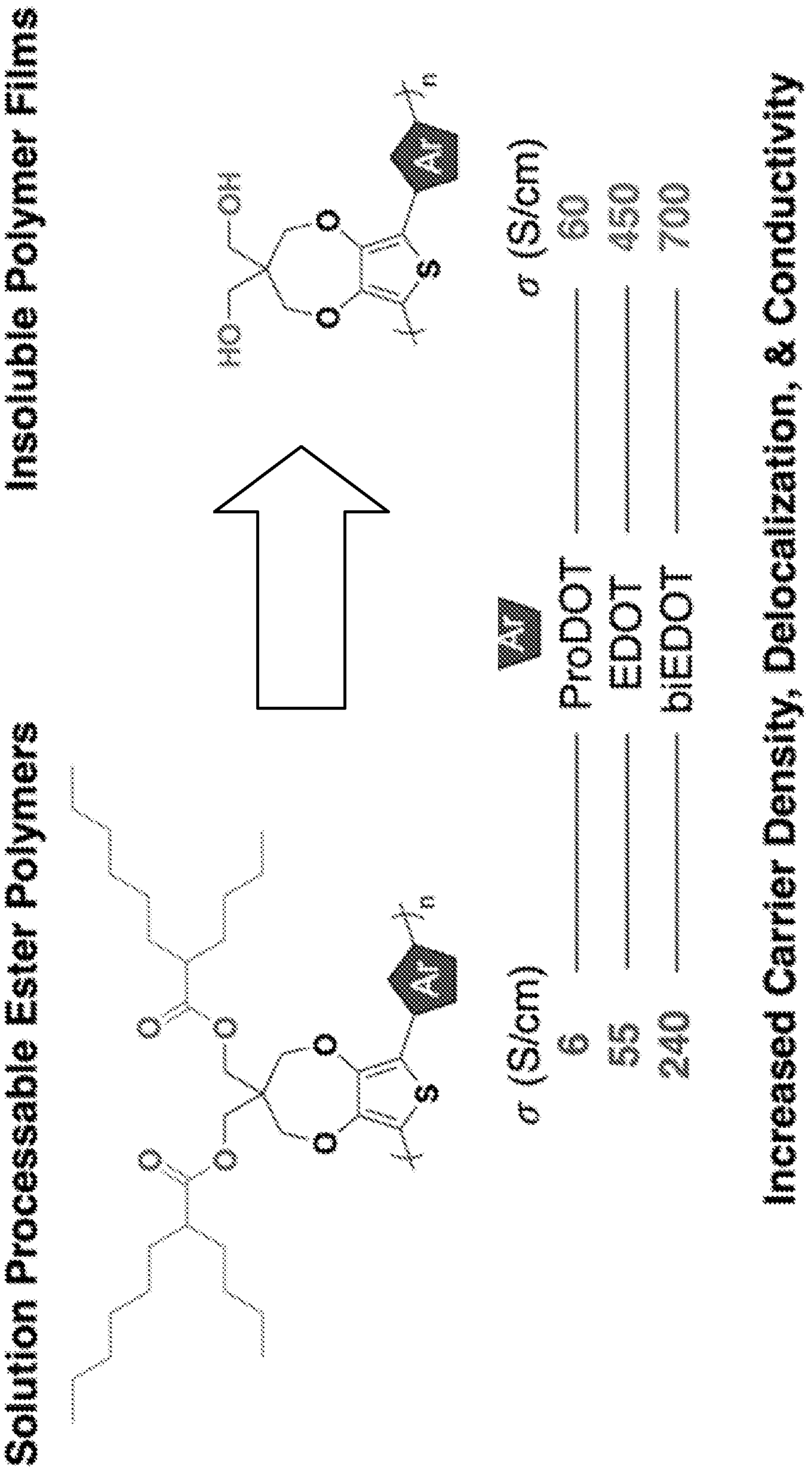
FIG. 1 illustrates a reaction scheme for making a conductive polymer material, in accordance with some examples of the present disclosure.

The processability and electronic properties of conjugated polymers have become increasingly important due to the potential of these materials in redox and solid-state devices for a broad range of applications. To solubilize conjugated polymers, side chains are needed, but such side chains reduce the relative fraction of electro-active material in the film, potentially obstructing π-π intermolecular interactions, localizing charge carriers, and compromising desirable opto-electronic properties. To reduce the deleterious effects of side chains, the presently disclosed conductive polymer materials can demonstrate that post-processing side chain removal, by way of the example of ester hydrolysis, can significantly increase the electrical conductivity of chemically doped conjugated polymer films.

In substituted polymers, the reduced electrical conductivity can be partly due to these side chains, whether hydrocarbon-; silyl-; or oligoether-based, being electrically insulating and electrochemically inactive. Two routes that can improve electrical conductivity (σ) in conjugated polymer thin film materials are: (i) reducing side chain length and (ii) introducing unfunctionalized "spacer" units. In regiorandom poly(3-alkylthiophenes), reducing side chain length (from n-dodecyl to n-octyl to n-hexyl to n-butyl) can progressively increase σ after chemical doping. Alternatively, the addition of unfunctionalized spacer units to a polymer structure can better incorporate dopant anions and reduce disruption to π-π stacking of polymer backbone when doped, resulting in improved solid-state σ. Thus, further reduction or even removal of side chains can be a promising route to consider for achieving higher electrical conductivity in doped systems, while maintaining processability using conventional methods.

As an alternative to side chain reduction via synthetic design, several post-processing modification strategies can be employed to remove, or shorten, side chains following processing, consequently either enhancing material performance or improving device stability. For example, thermally cleavable and photo-cleavable groups, along with acid cleavable silyl-based side chains, have been utilized for polythiophene derivatives. Polymers with ester-based side chains can be hydrolyzed to yield small and highly polar functional groups, thus promoting redox switching in aqueous electrolytes. When the carbonyl group of the ester is closest to the backbone, the resulting functionality post-hydrolysis is a carboxylate group, turning the polymer into a water-soluble conjugated polyelectrolyte that can be rendered solvent resistant (SR) upon application of an acid treatment. Alternatively, the pendant ester can be oriented such that only an alcohol group remains on the polymer backbone after hydrolysis, directly forming a SR material, provided no other solubilizing groups are present.

The polarity of the alcohol groups on the polymer can result in aqueous electrochemical compatibility, similar to use of carboxylic acid or oligoether groups. Cleavage to alcohol groups can be accomplished with either 3,4-ethylenedioxythiophene (EDOT)- or 3,4-propylenedioxythiophene (ProDOT)-based polymers that, following film casting, can be hydrolyzed via immersion in a hydroxide solution.

Beginning with a model system consisting of an ester functionalized ProDOT copolymerized with a dimethylProDOT, a variety of methods can be used to assess the changes in polymer film volume and morphology upon hydrolysis and resulting active material densification. Via a combination of electrochemistry, x-ray photoelectron spectroscopy, and charge transport models, this increase in electrical conductivity is not due to an increase in degree of doping, but an increase in charge carrier density and reduction in carrier localization that occurs due to side chain removal. With this improved understanding of side chain hydrolysis, this method can be applied to high-performance ProDOT-alt-$EDOT_x$ copolymers. After hydrolysis, these ProDOT-alt-$EDOT_x$ copolymers can yield exceptional electrical conductivities (~700 S/cm), outperforming all previously reported oligoether/glycol-based conjugated polymer systems. Ultimately, this methodology can advance the ability to solution process highly electrically conductive conjugated polymer films. Newer all EDOT-based systems can have even higher electrical conductivities of ~300 S/cm after hydrolysis without additional doping, and values of 600-1500 S/cm after doping with ferric tosylate or ferric chloride.

Understanding the mechanism of charge transport and tuning the σ in conjugated polymers is important for a range of applications, with some applications requiring relatively low conductivity (e.g. antistatic coatings) and others benefiting from the highest conductivity (or conductivity modulation), that can be achieved. This includes transparent thin film electrodes, various circuit elements, conductors in bioelectronic devices, and organic thermoelectric (OTE) devices. Solution-processable ProDOT-based polymers are also promising materials for these applications. The homopolymer poly(ProDOT($CH_2OEtHx)_2$) (referred to here as P(EtHx)) can attain a relatively low σ on the order of $10^{-3}$ S/cm upon doping. Substitution of the branched alkyl side chains for either linear alkyl or linear oligoether chains increases the conductivity of this ProDOT backbone by 3 orders of magnitude to ~1 S/cm. Alternatively, modification of the backbone structure with an electron-rich spacer such as biEDOT can increase the σ to over 200 S/cm with optimized doping.

The disclosed methods can affect changes in the solid-state σ in ProDOT copolymers upon removal of side chains using the previously described ester hydrolysis method and subsequent oxidative solution doping. Corresponding changes in the Seebeck coefficient(S) are reported, as this parameter is important for understanding the broader charge transport and thermoelectric behavior of a material. The polymer selected for a thorough analysis of this methodology consists of a ProDOT core functionalized with 2-butyloctyl ester (BOE) side chains copolymerized with a 2,2-dimethyl-substituted ProDOT comonomer (referred to as DMP). This material, termed here as P(BOE)-D, can be a high-contrast electrochromic material with excellent redox kinetics and switching stability. Basic hydrolysis of P(BOE)-D films yields the alcohol-functionalized and SR P(OH)-D films. Ferric tosylate hexahydrate ($FeTos_3$) can be selected as the primary dopant as it effectively dopes XDOT-based polymers, does not require inert or dry conditions for doping, and can be easily quantified by x-ray photoemission spectroscopy (XPS).

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

The term "aliphatic" or "aliphatic group," as used herein, means a straight-chain (i.e., unbranched) or branched, substituted or unsubstituted hydrocarbon chain that is completely saturated or that contains one or more units of unsaturation, or a monocyclic hydrocarbon, bicyclic hydrocarbon, or tricyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-30 aliphatic carbon atoms. In some embodiments, aliphatic groups contain 1-20 aliphatic carbon atoms. In other embodiments, aliphatic groups contain 1-10 aliphatic carbon atoms. In still other embodiments, aliphatic groups contain 1-6 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "cycloaliphatic," as used herein, refers to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a 'carbocyclic group is tricyclic. In some embodiments, a carbocyclic group is polycyclic. In some embodiments, "cycloaliphatic" (or "carbocycle" or "cycloalkyl") refers to a monocyclic C3-C6 hydrocarbon, or a C8-C10 bicyclic hydrocarbon that is completely saturated or that contains one or more units of unsaturation, but which is not aromatic, that has a single point of attachment to the rest of the molecule, or a C9-C16 tricyclic hydrocarbon that is completely saturated or that contains one or more units of unsaturation, but which is not aromatic, that has a single point of attachment to the rest of the molecule.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 1-20 carbon atoms in its backbone (e.g., C1-C20 for straight chain, C2-C20 for branched chain), and alternatively, 1-10 carbon atoms, or 1 to 6 carbon atoms. In some embodiments, a cycloalkyl ring has from 3-10 carbon atoms in their ring structure where such rings are monocyclic or bicyclic, and alternatively 5, 6 or 7 carbons in the ring structure. In some embodiments, an alkyl group may be a lower alkyl group, wherein a lower alkyl group comprises 1-4 carbon atoms (e.g., C1-C4 for straight chain lower alkyls).

As used herein, the term "alkenyl" refers to an alkyl group, as defined herein, having one or more double bonds.

As used herein, the term "alkynyl" refers to an alkyl group, as defined herein, having one or more triple bonds.

As used herein, the term "azide" is given its ordinary meaning in the art and may include an alkyl group, as defined herein, having one or more azide functional groups.

The term "heteroalkyl" is given its ordinary meaning in the art and refers to alkyl groups as described herein in which one or more carbon atoms is replaced with a heteroatom (e.g., oxygen, nitrogen, sulfur, and the like). Examples of heteroalkyl groups include, but are not limited to, alkoxy, poly(ethylene glycol), alkyl-substituted amino, tetrahydrofuranyl, piperidinyl, morpholinyl, etc.

The term "aryl" used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system which includes, but not limited to, phenyl, biphenyl, naphthyl, binaphthyl, anthracyi and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

The terms "heteroaryl" and "heteroar-," used alone of as part of a larger moiety, e.g., "heteroaralkyl," or "heteroaralkoxy," refer to groups having 5 to 10 ring atoms (i.e., monocyclic or bicyclic), in some embodiments 5, 6, 9, or 10 ring atoms. In some embodiments, such rings have 6, 10, or 14 $\pi$ electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. In some embodiments, a heteroaryl is a heterobiaryl group, such as bipyridyl and the like. The terms "heteroaryl" and "heteroar-," as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be monocyclic, bicyclic, tricyclic, tetracyclic, and/or otherwise polycyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothiophenyl pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl. A heterocyclyl group may be monocyclic, bicyclic, tricyclic, tetracyclic, and/or otherwise polycyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation but is not intended to include aryl or heteroaryl moieties, as herein defined.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring.

The term "unsaturated," as used herein, means that a moiety has one or more units of unsaturation.

The term "halogen" means F, Cl, Br, or I; the term "halide" refers to a halogen radical or substituent, namely —F, —Cl, —Br, or —I.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

The term "spiro compound" refers to a chemical compound that presents a twisted structure of two or more rings, in which at least 2 rings are linked together by one common atom, e.g., a carbon atom. When the common atom is located in the center of the compound, the compound is referred to as a "spirocentric compound." The common atom that connects the two or more rings is referred to as the "spiroatom." When such common atom is a carbon atom, it is referred to as the "spiro-carbon."

Unless otherwise stated, all tautomeric forms of the compounds of the invention are within the scope of the invention.

Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a 11C- or 13C- or 14C-enriched carbon are within the scope of this invention.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

As shown in FIG. 1, a functionalized polymer solution can be provided comprising a conductive backbone of conjugated monomer units and a plurality of nonconductive side chains. As shown, the plurality of nonconductive side chains can be cleaved off of the conductive backbone to form a conductive polymer material.

The conductive polymer material can be insoluble in at least one solvent. Suitable examples of a solvent can include, but are not limited to, nonpolar solvents, polar aprotic solvents, polar protic solvents, water-miscible solvents, non-coordinating solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, chloroform, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, water, dichloromethane, tricholormethane, isopropyl alcohol, or a combination thereof.

The conductive backbone in the conductive polymer material can comprise conjugated monomer units substituted with a hydroxymethyl substituent. Alternatively, or additionally, the conductive polymer material can comprise a plurality of conjugated electron donor monomer units and/or a plurality of conjugated electron acceptor monomer units. A conductive polymer (D)n material can comprise a plurality of conjugated electron donor monomer units. A conductive polymer (A)n material can comprise a plurality of conjugated electron acceptor monomer units. The conjugated monomer units can also comprise dioxyheterocycles.

The conjugated monomer units can have the structure of:
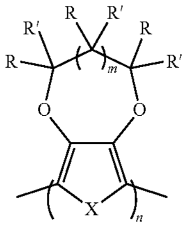
,
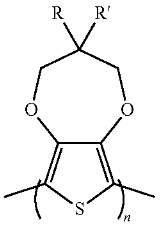
,
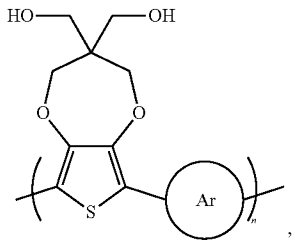
,
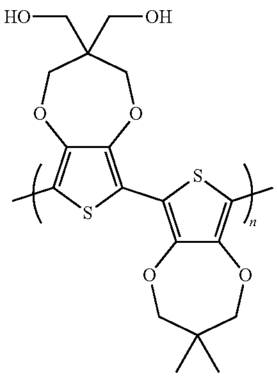
,
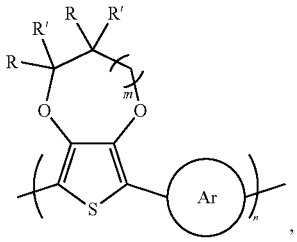
,
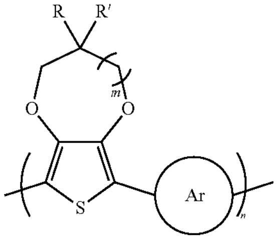
,
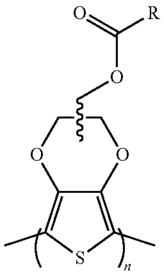
,
-continued
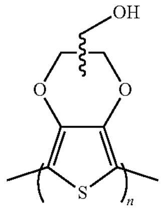
,
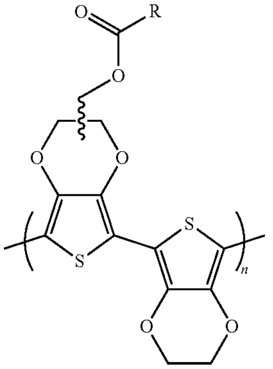
,
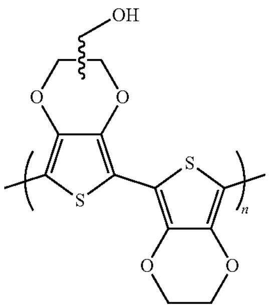
,
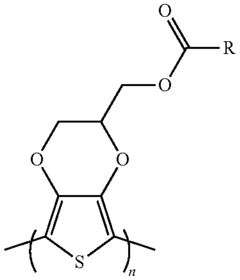
,
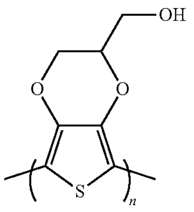
,
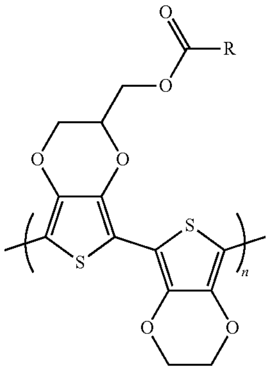
,
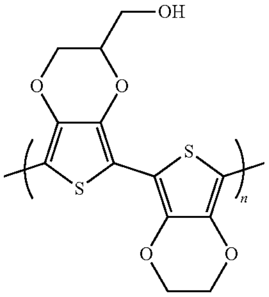
,
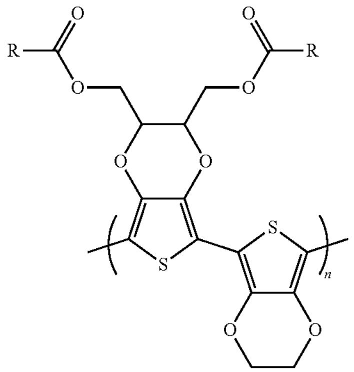
, -continued

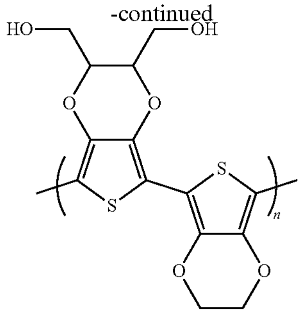

,

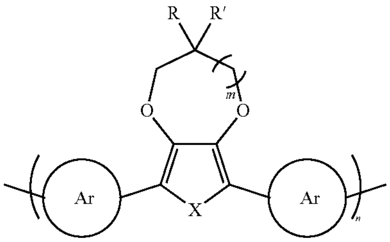

, or

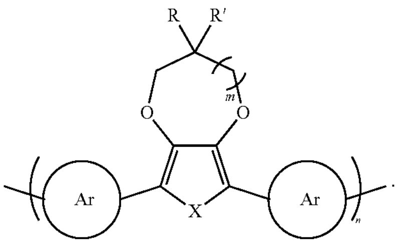

In the conjugated monomer unit structures described above, X can be S, O, Se, NR, or NR'; R can be II, a straight chained, branched chain, cyclic, or substituted cyclic alkyl group or any alcohol, ester, carboxylate or carboxylic acid functional group, or any aryl, benzyl, or alkylaryl; R' can be H, a straight chained, branched chain, cyclic, or substituted cyclic alkyl group or any alcohol, ester, carboxylate or carboxylic acid functional group, or any aryl, benzyl, or alkylaryl; n can be from 10 to 10,000; and m can be from 0 to 3.

The conductive polymer material can further comprise a plurality of alcohol functional groups bonded to the conductive backbone. Additional suitable functional groups can be bonded to the conductive backbone as desired. Suitable examples of functional groups can include, but are not limited to: alkanes, alkenes, alkynes, aromatics, benzene or phenyl derivatives, haloalkanes, fluoroalkanes, chloroalkanes, bromoalkanes, iodoalkanes, alcohols, ketones, aldehydes, acyl halides, carbonates, carboxylates, carboxylic acids, esters, hydroperoxides, peroxides, ethers, hemiacetals, hemiketals, acetals, orthoesters, heterocycles, organic acid anhydrides, amides, amines, imines, imides, azides, azo compounds, cyanates, nitrates, nitriles, nitrites, nitro compounds, nitroso compounds, oximes, pyridine or pyridine derivatives, carbamate esters, thiols, sulfides, disulfides, sulfoxides, sulfones, sulfinic acids, sulfonic acids, sulfonate esters, thiocyanates, thioketones, thials, thiocarboxylic acids, thioesters, phosphines, phosphanes, phosphonic acids, phosphates, phosphodiesters, boronic acids, boronic esters, borinic acids, borinic esters, epoxides, cycloalkanes, pyrroles, thiophenes, pyrans, furans, dioxins, furfurals, imidazoles, pyrimidines, toluenes, thiazoles, pyrazoles, oxazoles, triazoles, purines, or any combination thereof. Additional functional groups known to one of ordinary skill in the art may be chosen to confer certain desirable properties to the conductive polymer material.

The plurality of nonconductive side chains can comprise ester functional groups. Additional suitable functional groups can be bonded to or part of the nonconductive side chains as desired. Suitable examples of functional groups can include, but are not limited to: alkanes, alkenes, alkynes, aromatics, benzene or phenyl derivatives, haloalkanes, fluoroalkanes, chloroalkanes, bromoalkanes, iodoalkanes, alcohols, ketones, aldehydes, acyl halides, carbonates, carboxylates, carboxylic acids, esters, hydroperoxides, peroxides, ethers, hemiacetals, hemiketals, acetals, orthoesters, heterocycles, organic acid anhydrides, amides, amines, imines, imides, azides, azo compounds, cyanates, nitrates, nitriles, nitrites, nitro compounds, nitroso compounds, oximes, pyridine or pyridine derivatives, carbamate esters, thiols, sulfides, disulfides, sulfoxides, sulfones, sulfinic acids, sulfonic acids, sulfonate esters, thiocyanates, thioketones, thials, thiocarboxylic acids, thioesters, phosphines, phosphanes, phosphonic acids, phosphates, phosphodiesters, boronic acids, boronic esters, borinic acids, borinic esters, epoxides, cycloalkanes, pyrroles, thiophenes, pyrans, furans, dioxins, furfurals, imidazoles, pyrimidines, toluenes, thiazoles, pyrazoles, oxazoles, triazoles, purines, or any combination thereof. Additional functional groups known to one of ordinary skill in the art may be chosen to confer certain desirable properties to the conductive polymer material. As would be appreciated, an ester functional group can improve the solution processability of the functionalize polymer solution.

Figure 2:
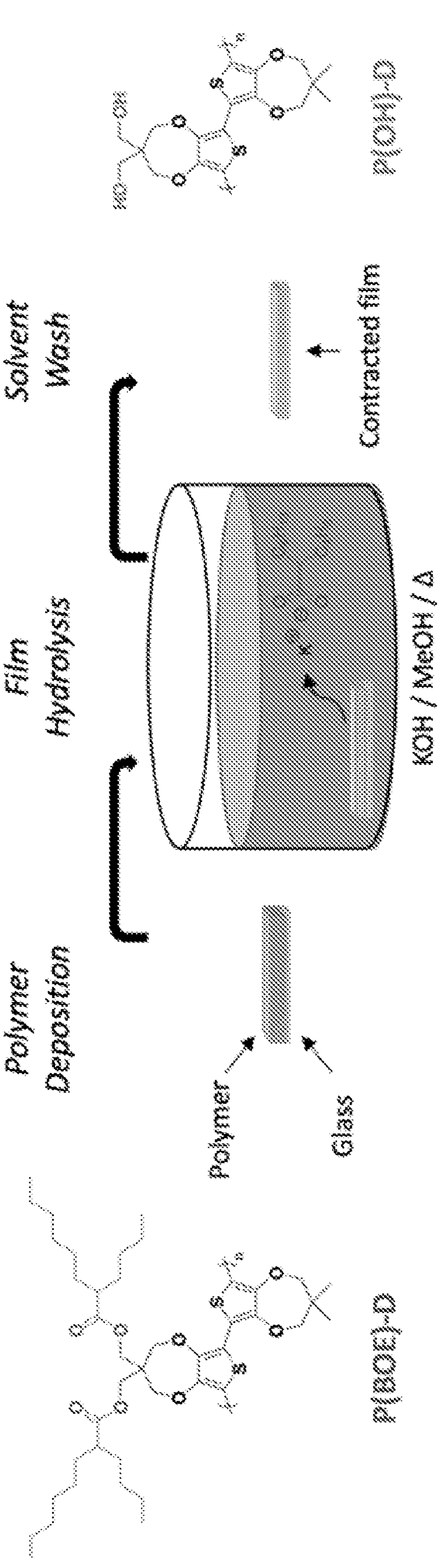
FIG. 2 illustrates another reaction scheme for making a conductive polymer material, in accordance with some examples of the present disclosure.

Cleaving the plurality of nonconductive side chains can comprise a hydrolysis reaction, thermal cleavage, or a photocleavage reaction. For example, as shown in FIG. 2, if the nonconductive side chains comprise an ester functional group, the cleaving can comprise a hydrolysis reaction. Cleaving the plurality of nonconductive side chains can further comprise volumetrically contracting the conductive polymer material. As would be appreciated, removal of functional side chains can reduce the steric hinderance between polymer chains and allow for closer interactions of the conductive backbone.

As described above, cleaving the plurality of nonconductive side chains can comprise a hydrolysis reaction. Suitable examples of a hydrolysis reactions scheme can include:

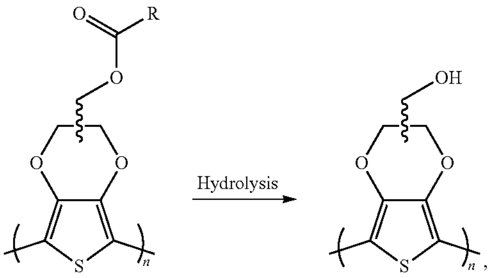

,

-continued

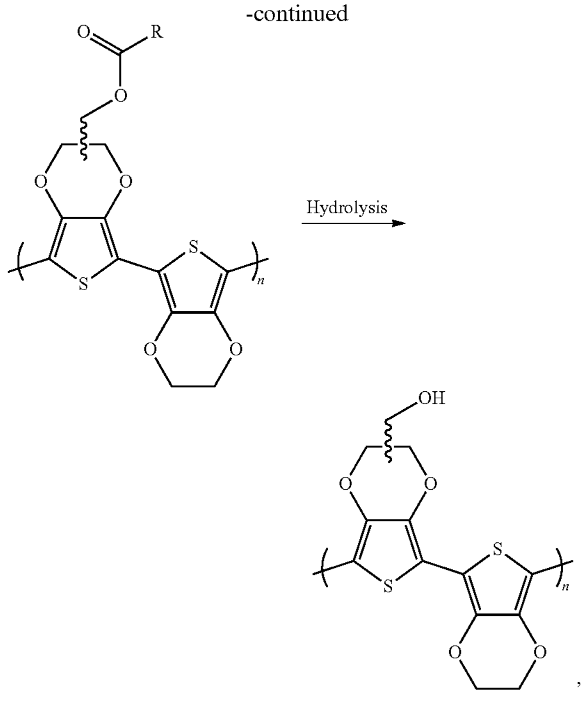

,

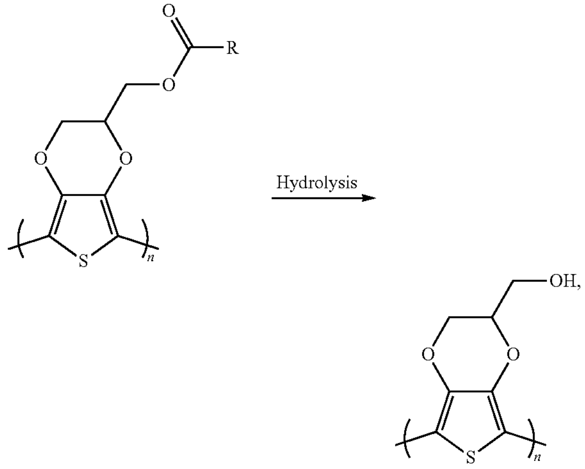

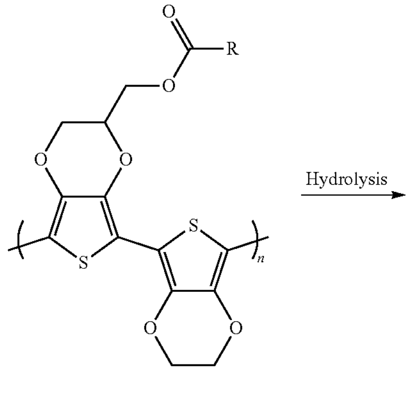

-continued

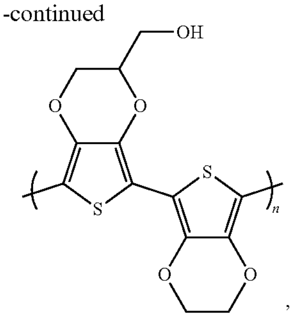

, or

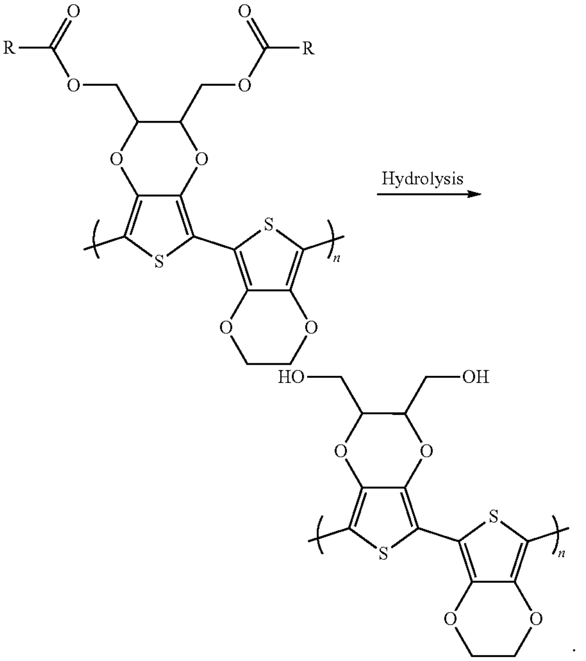

.

The conductive polymer material can have a conductivity from 10 S/cm to 100,000 S/cm (e.g., from 10 S/cm to 90,000 S/cm, from 10 S/cm to 80,000 S/cm, from 10 S/cm to 70,000 S/cm, from 10 S/cm to 60,000 S/cm, from 10 S/cm to 50,000 S/cm, from 10 S/cm to 40,000 S/cm, from 10 S/cm to 30,000 S/cm, from 10 S/cm to 20,000 S/cm, from 10 S/cm to 10,000 S/cm, from 20 S/cm to 100,000 S/cm, from 30 S/cm to 100,000 S/cm, from 40 S/cm to 100,000 S/cm, from 50 S/cm to 100,000 S/cm, from 60 S/cm to 100,000 S/cm, from 70 S/cm to 100,000 S/cm, from 80 S/cm to 100,000 S/cm, from 90 S/cm to 100,000 S/cm, or from 100 S/cm to 100,000 S/cm). The conductivity of the conductive polymer material can be relative to the material before and/or after doping, such as oxidative doping.

The Seebeck coefficient of the conductive polymer material can be decreased when compared to the Seebeck coefficient of the functionalized polymer solution on the substrate. For example, the Seebeck coefficient of the conductive polymer material can decrease from +46 μV/K to +19 μV/K after cleaving the nonfunctional side chains from the functionalized polymer solution to form the conductive polymer material. The Seebeck coefficient of the conductive polymer material can be from +10 μV/K to +100 μV/K (e.g., from +10 μV/K to +90 μV/K, from +10 μV/K to +80 μV/K, from +10 μV/K to +70 μV/K, from +10 μV/K to +60 μV/K, from +10 μV/K to +50 μV/K, from +10 μV/K to +40 μV/K, from +10 μV/K to +30 μV/K, or from +10 μV/K to +20 μV/K).

As shown in FIG. 2, the functionalize polymer solution can be cast on a substrate prior to the cleaving. Additionally, after cleaving the nonfunctional side chains, the remaining conductive polymer material cast on the substrate can be volumetrically contracted to form a conductive film material. The conductive film material can comprise the conductive polymer material with the conductive backbone. While the cleaving is illustrated by a hydrolysis reaction in FIG. 2, it is understood that other methods of cleaving can be used, such as photo cleavage and/or thermal cleavage.

Figure 3:
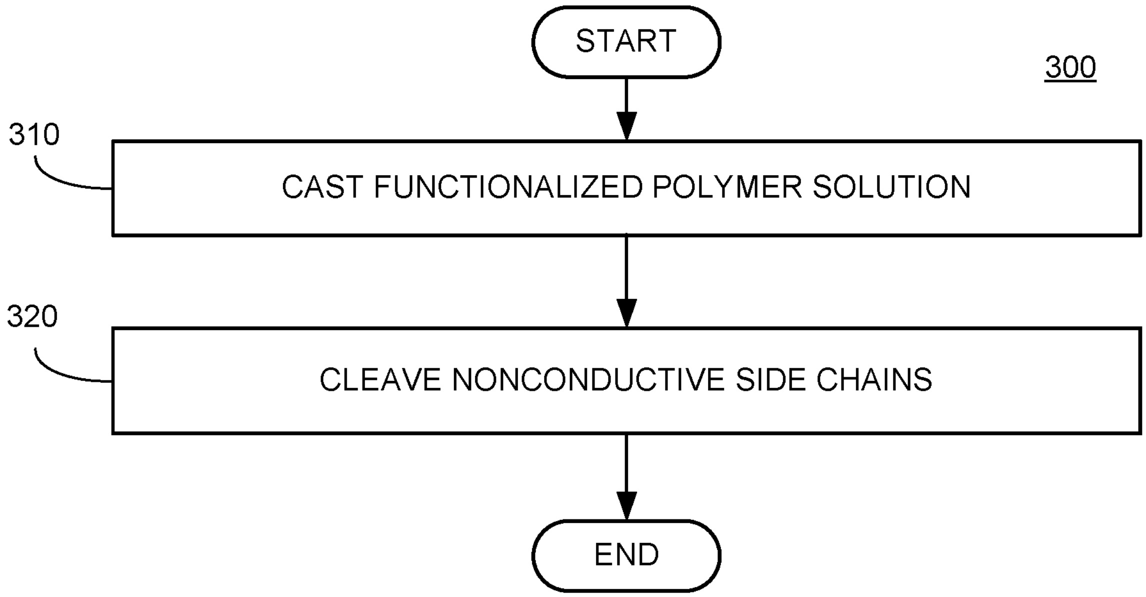
FIG. 3 illustrates a flowchart of a method for making a conductive polymer material, in accordance with some examples of the present disclosure.

FIG. 3 illustrates a method 300 of making a conductive polymer material. As shown in block 310, a functionalized polymer solution can be cast on a substrate. The functionalized polymer solution can comprise a conductive backbone and a plurality of nonconductive side chains. The plurality of nonconductive side chains can comprise functional groups to encourage the functionalized polymer solution to be solution-processible. The functional groups can be selected as desired as described above. For example, the plurality of nonconductive side chains can comprise ester functional groups. Additionally, the conductive backbone in the conductive polymer material can comprise conjugated monomer units substituted with a hydroxymethyl substituent. The conductive backbone can further comprise any structure or chemical formula as described above. The method 300 can then proceed on to block 320.

In block 320, the nonconductive side chains can be cleaved off the conductive backbone to form the conductive polymer material. Cleaving the plurality of nonconductive side chains can comprise a hydrolysis reaction, thermal cleavage, or a photocleavage reaction. For example, as shown in FIG. 2, if the nonconductive side chains comprise an ester functional group, the cleaving can comprise a hydrolysis reaction. Cleaving the plurality of nonconductive side chains can further comprise volumetrically contracting the conductive polymer material. As would be appreciated, removal of functional side chains can reduce the steric hinderance between polymer chains and allow for closer interactions of the conductive backbone. The method 300 can terminate after block 320. However, in some examples, the method 300 can proceed on to other method steps not shown.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

The following examples are provided by way of illustration but not by way of limitation.

Figure 4:
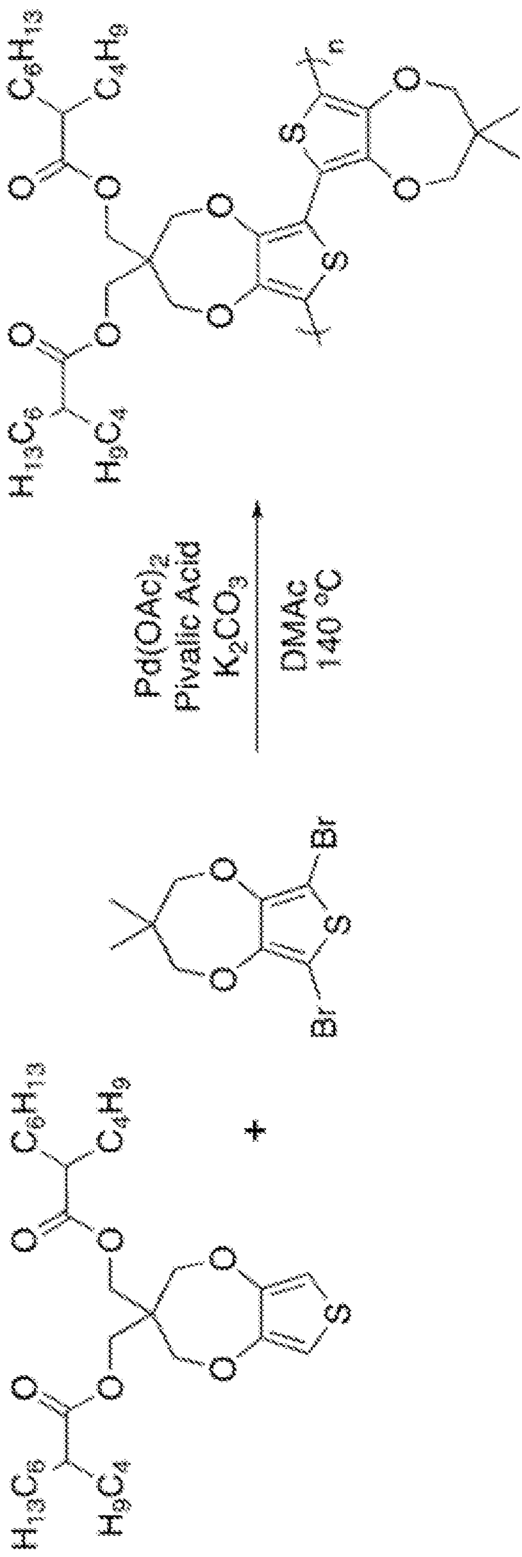
FIG. 4 illustrates a reaction scheme for making a conductive polymer material, in accordance with some examples of the present disclosure.

The model polymer system, P(BOE)-D, can be prepared using direct (hetero) arylation polymerization (DHAP), as shown in FIG. 4, with a molecular weight of $M_n$=72.6 kg/mol (Đ=2.3). Polymer films can be cast on non-conductive glass substrates via blade-coating from chloroform and then fully dried under vacuum. Following blade coating of P(BOE)-D on glass substrates, the films can be either directly doped with a $FeTos_3$ solution or hydrolyzed through a base treatment. Doping can be performed by dropping a 30 mg/mL solution of $FeTos_3$ in acetonitrile (ACN) on the films, allowing to dope for 60 seconds, and subsequently washing with clean ACN and drying under vacuum.

As outlined in FIG. 2, side chain hydrolysis can be performed by immersing the film in a warm solution of KOH/methanol, cleaving the side chains, and dissolving the resulting potassium carboxylate into solution over time. Films can then be washed with clean methanol or ethanol, yielding hydrolyzed films of P(OH)-D, structurally shown in FIG. 2, that are completely insoluble in typical solvents (e.g., THF, DMF, toluene, $CHCl_3$, etc.). The backbone is not vulnerable to basic conditions, and the number average degree of polymerization ($X_n$) is not expected to change during this process. Removal of the side chains can increase the relative amount of electroactive material in the films significantly; only ~9% of the film (assuming complete hydrolysis of the ester) comprises remaining side chains in the form of hydroxymethyl groups compared to the starting organic soluble polymer, which comprises more than 50% ester side chain by mass.

Figure 5:
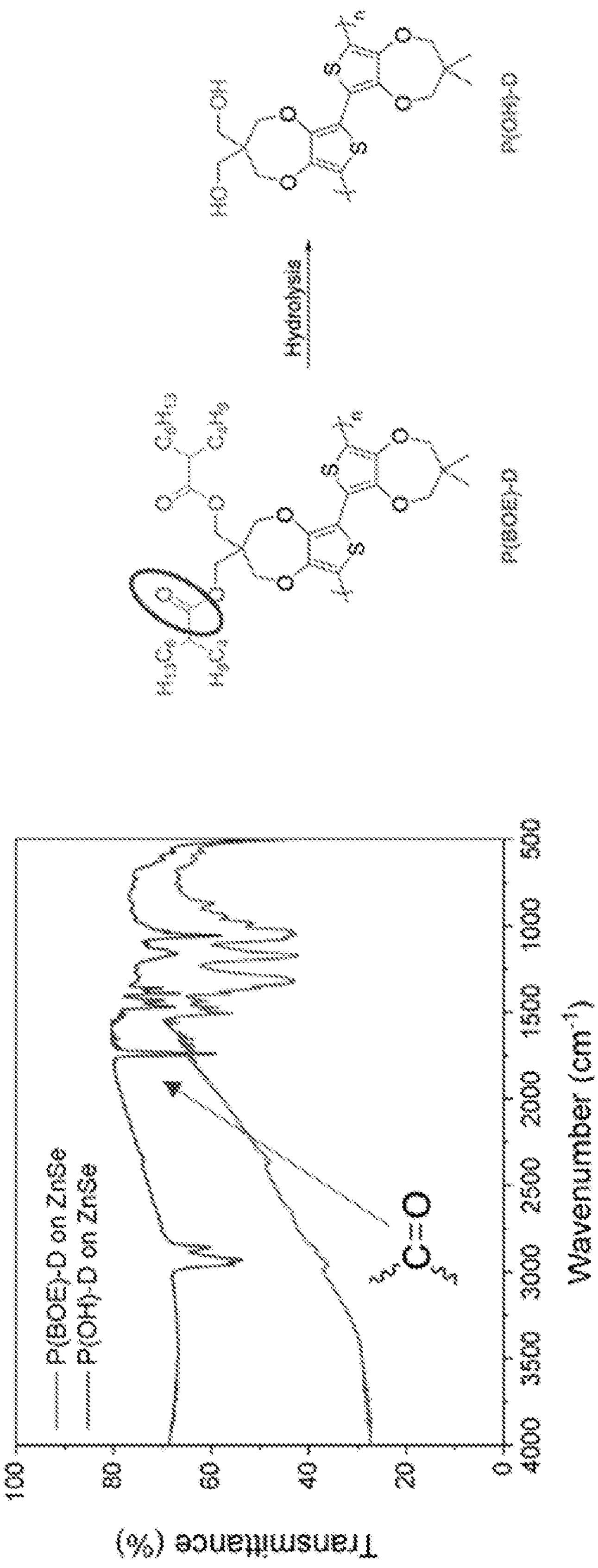
FIG. 5 illustrates a transmittance IR spectrum for a conductive polymer material, in accordance with some examples of the present disclosure.
Figure 6B:
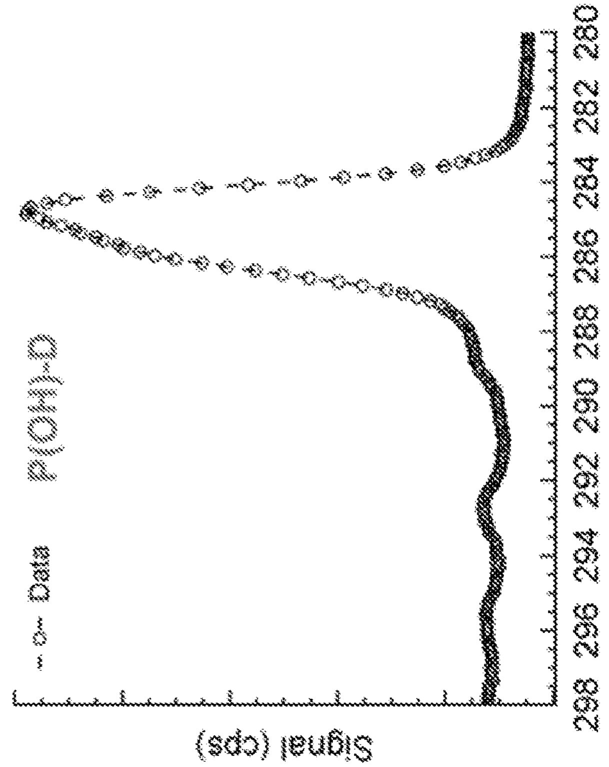
FIGS. 6A and 6B illustrate carbon XPS spectra for a conductive polymer material, in accordance with some examples of the present disclosure.
Figure 6A:
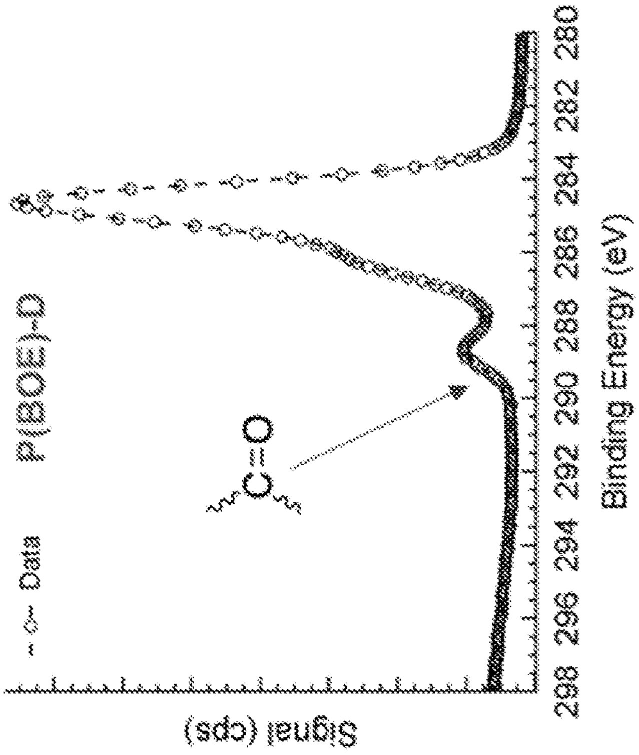

IR spectroscopy can be used to show removal of side chains via loss of the carbonyl stretch after solution hydrolysis. This same removal of the carbonyl can be shown using both transmittance IR (FIG. 5) and carbon XPS (FIGS. 6A and 6B). In addition to these methods, profilometry can be used to quantify the change in film thickness following hydrolysis and doping. Upon film hydrolysis and drying under vacuum, the P(BOE)-D films can show a thickness reduction of 43.4±4.6% (as measured from 3 separate films) during conversion to P(OH)-D, which is consistent with the expected 43% mass removal based on repeat unit structures (assuming a density of 1 $g/cm^3$). This change in film thickness can indicate that the side chains are being effectively removed from the bulk of the film and not just the surface. Doping of polymer films with $FeTos_3$ can result in a 17±9% and 36±12% increase in film thicknesses for P(BOE)-D and P(OH)-D, respectively. Therefore, the doped P(OH)-D film can be approximately 34% thinner than the doped P(BOE)-D film. An additional change in surface energy can be seen upon hydrolysis, with alcohol functionalized P(OH)-D having a smaller water contact angle (59±6°) with water compared to that of P(BOE)-D (81±4°).

Figure 7A:
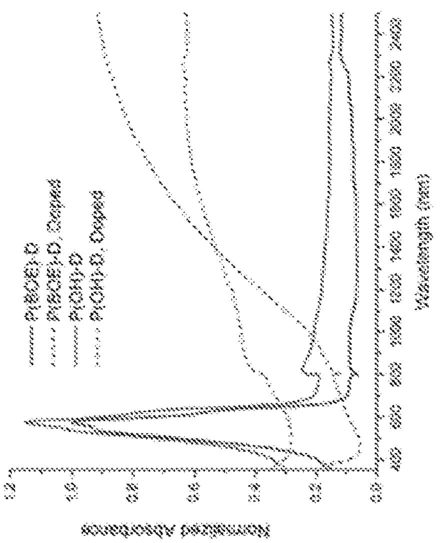
FIGS. 7A-C illustrate plots of UV-vis spectra, cyclic votammograms, and differential pulse votammograms for conductive polymer materials, in accordance with some examples of the present disclosure.

UV-vis spectroscopy can be used to compare the optical properties of the materials. As seen in FIG. 7A, upon hydrolysis there is no change in the optical bandgap or absorption profile, but simply an increase in baseline absorbance due to higher scattering in the film (as seen from the higher baseline that decreases at longer wavelengths). This is in contrast to other materials, where the ProDOT-based polymer displayed differences in optical properties following hydrolysis. Without wishing to be bound by any particular scientific theory, it is hypothesized that this is because the polymer material has side chains on alternating units with a DMP spacer, while other materials had side chains on every unit. As the polymer backbones are still exclusively ProDOT-based backbone, the introduction of a non-alkylated spacer unit can lower the onset of oxidation and optical bandgap of P(ProDOT($CH_2$OEtHx)-alt-DMP) compared to the fully alkylated ProDOT homopolymer (P(EtHx)). As the absorbance of the films do not decrease following hydrolysis, the backbone π system is not damaged by the basic hydrolysis and the same amount of ProDOT moieties are present in the P(OH)-D films.

Upon doping P(BOE)-D films with $FeTos_3$, the π-π* transition can be fully depleted, and a bipolaron absorbance band is observed, as seen in FIG. 7A. This doped spectrum can be comparable to the spectroelectrochemical analysis of P(BOE)-D (electrochemically doped with $TBAPF_6$ in PC) and shows no polaronic transition (centered around ~930 nm) corresponding to intermediate degrees of doping seen in the spectroelectrochemistry. Following hydrolysis and doping, P(OH)-D films can also show full depletion of the π-π* transition; however, the resulting bipolaron band extends further into the visible region and is less intense further into the IR compared to that of P(BOE)-D.

Figure 7B:
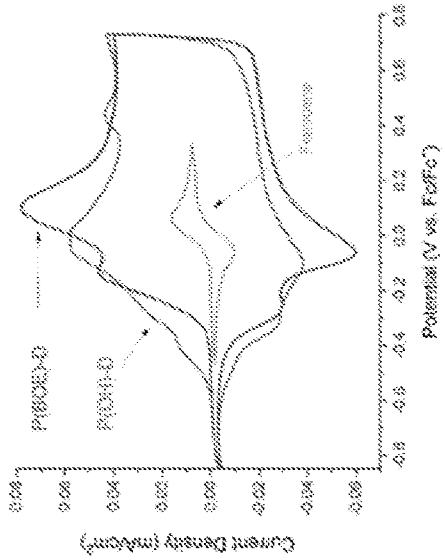
Figure 7C:
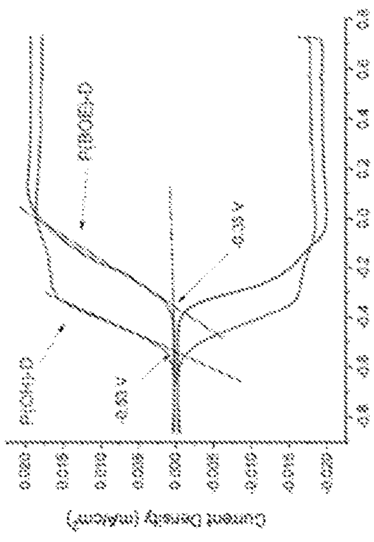

As seen in both the cyclic voltammograms (CVs) (FIG. 7B) and differential pulse voltammograms (DPVs) (FIG. 7C), film hydrolysis can lead to a reduction in the onset of oxidation ($E_{ox}$). This 180 mV reduction of $E_{ox}$ for P(OH)-D, determined by DPV, can be attributed to several factors, including better charge transport between polymer chains. It is expected these more polar functionalities can assist in ion transport through films as the oligoether functionalized analog, P(OE3)-D, can also shows a reduced $E_{ox}$ (−0.46 V vs $Fc/Fc^+$ in $TBAPF_6$/PC) and rapid electrochemical switching. Despite the change in oxidation onset, the charge measured by CV does not significantly change as the backbone it not altered. The electrochemical oxidations of P(BOE)-D and P(OH)-D required charges of 0.87 $mC/cm^2$ and 0.88 $mC/cm^2$, respectively, for switching over the same voltage window. The comparable charge required to switch the films indicates the same number of electrochemical sites are being accessed before and after hydrolysis, providing further indication that active backbone materials is not being lost/damaged due to the hydrolysis.

Figure 8:
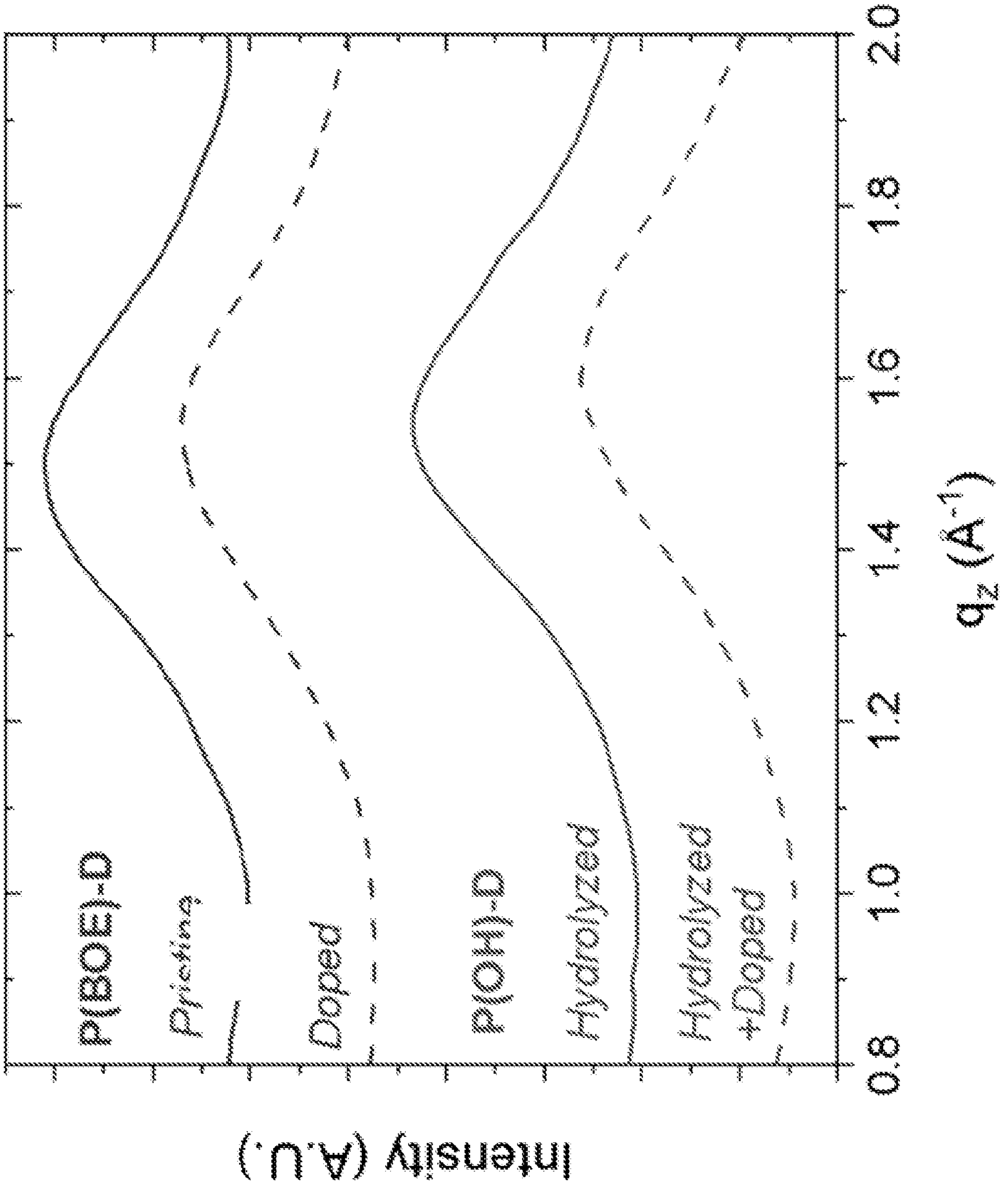
FIG. 8 illustrates line cuts of grazing-incidence wide-angle x-ray scattering (GIWAXS) analysis for conductive polymer materials, in accordance with some examples of the present disclosure.

Topographical imaging by tapping-mode AFM of the films can reveal a marginal increase in surface roughness and feature size upon hydrolysis, suggesting an increase in physical heterogeneity in the system, perhaps due heterogeneous diffusion of residual side chain out of the film during saponification, leading to uneven film contraction. Doping can be associated with additional changes in the topography of the ProDOT films. Doping with the $FeTos_3$ solution can result in a drastic (~4×) increase in surface roughness of P(BOE)-D, while the roughness of the film P(OH)-D does not result in such roughness changes. This result may suggest that the polymer with the long, branched side chains undergoes a larger structural reorganization upon dopant infiltration into the film. AFM phase images can reveal significantly higher phase shifts for the P(OH)-D compared to P(BOE)-D, which can be indicative of changes in the mechanical properties and/or surface chemistry, as would be expected when the side chains bulk is reduced a new polar functionality is introduced. Grazing-incidence wide-angle x-ray scattering (GIWAXS) analysis can indicate isotropic orientation of the P(BOE)-D polymer in its pristine state. Line cuts of the GIWAXS spectra (FIG. 8) can be used to extract the π-π spacing of the different states of the polymer films. The π-π spacing contracts upon both doping (4.05 Å), and hydrolysis (4.02 Å), compared to the pristine state (4.24 Å), as shown below in Table I. Doping following hydrolysis further decreases this distance to 3.89 Å.

TABLE I

Electrical properties of ProDOT-DMP films on glass substrates in ambient conditions.

| Polymer State | s (S/cm) | S (μV/K) |
|---|---|---|
| Pristine P(BOE)-D | $<10^{-5}$ | N/A |
| Doped P(BOE)-D | 6.1 ± 2.8 | 45.9 ± 11 |
| P(OH)-D | 0.009 | N/A |
| Doped P(OH)-D | 62.5 ± 7.8 | 18.5 ± 1.5 |

Removing the insulating hydrocarbon side chains can increase the electrical conductivity of polymer films based on two potential mechanisms, without wishing to be bound by any particular scientific theory. First, effective medium and percolation models show that decreasing the electrically insulative volume fraction can increase the electrical conductivity but should not substantially affect the Seebeck coefficient. Second, the conjugated main chains are packed closer (as evident from profilometry and GIWAXS π-π distances outlined in the previous section), which can increase the molecular orbital overlap between chains, increase the electronic bandwidth, and yield a more metal-like electronic structure. This more metal-like electronic structure can result in a concomitant increase in σ and decrease in S, which is not predicted using macroscopic percolation models alone. Measuring and modeling percolation pathways, percolation volume fractions, and molecular orbital overlap in chemically doped CPs is nontrivial. However, quantifying the extent to which these phenomena affect the resulting transport properties is possible by measuring temperature dependent thermoelectric properties and applying the SLoT model.

The SLoT model builds upon the Boltzmann transport equations and uses measurable transport properties (σ,S) to quantify how design parameters (polymer, dopant, and processing selections) affect the delocalized (metal-like) and localized (hopping-like) transport contributions. To use the Boltzmann transport equation, a charge transport function must be asserted, and the transport function ought to be consistent with the measurable transport properties, transport mechanisms, and the material's electronic structure. The transport function for the SLoT model is, $$\sigma_E(E, T, n) = \left\{ \begin{array}{c} 0, E < E_t \\ \sigma_0 \exp\left(-\frac{W_H(n)}{k_B T}\right) \times \left(\frac{E - E_t}{k_B T}\right), E \geq E_t \end{array} \right\}, \quad (1)$$

which asserts that charge carriers located at electron energies (E) contribute to the observable transport properties and have a nonzero transport function if their energies are greater than the transport edge energy ($E_t$). The SLoT transport function also asserts that the electron energy dependent contribution has a linear dependency, $$\left(\frac{E - E_t}{k_B T}\right).$$

This linear dependency is akin to that used for inorganic thermoelectrics with single parabolic bands, acoustic phonon scattering, and delocalized charge carriers, and this linear dependency yields a more reasonable electronic structure compared to a superlinear energy dependency. Additionally, the SLoT model asserts an Arrhenius-like localized contribution to the transport function, $$\exp\left(-\frac{W_H(n)}{k_B T}\right),$$

which is independent of the energy levels that the charge carriers occupy. $W_H$ is the localization energy, and this localization can arise from many physical phenomena, including spatial and electrostatic effects. The SLoT model shows that, as the carrier ratio (c) and/or charge carrier density (n) increases, $W_H$ decreases because the carriers become spatially closer to one another (note that c and n are directly related). $W_H$ systematically reduces σ (like the Mott polaron and Marcus models); however, as n (and/or c) increases, $W_H \to 0$, and $$\exp\left(-\frac{W_H}{k_B T}\right) \to 1$$

(in general). Lastly, $\sigma_0$ is a scalar constant for a polymer-dopant-processing system, and it can be related to characteristic mobilities in an ideal system.

With the SLoT transport function (Eq. 1), the electrical conductivity is expressed as, $$\sigma = \int_{-\infty}^{+\infty} \sigma_E(E, T, n)\left(-\frac{df}{dE}\right)dE, \tag{2}$$

and the Seebeck coefficient as, $$S = \left(\frac{1}{\sigma}\right)\left(\frac{k_B}{e}\right)\int_{-\infty}^{+\infty} \sigma_E(E, T, n)\left(\frac{E - E_F}{k_B T}\right)\left(-\frac{df}{dE}\right)dE. \tag{3}$$

These integral expressions are akin to delocalized transport formalisms, but the SLoT model includes both a localization contribution, $$\exp\left(-\frac{W_H(n)}{k_B T}\right),$$

and scalar prefactor, $\sigma_0$, that can be evaluated outside the energy dependent integrals. Although σ is a function of $\sigma_0$ and $W_H$ (Eq.1 and Eq. 2), S is independent of these parameters as they cancel one another in Eq. 3. Therefore, S is solely a function of the electronic structure, the filling of electronic states, and the energetic position of the Fermi level with respect to the transport edge (defined as $$\eta = \frac{E_F - E_t}{k_B T}\Big).$$

As the extent of doping, carrier density, and/or bandwidth of electronic states increases, the energy levels which the charge carriers occupy and the Fermi energy level increase with respect to the transport edge, so σ increases, and S decreases. Additionally, with a known S and η, and by measuring σ(T) and S(T), $W_H$ can be calculated. Ultimately, the SLoT model provides a concise model to quantify both the hopping-like ($W_H$) and metal-like $$\left(\eta, \int_{-\infty}^{+\infty} \sigma_E(E, T, n)\left(-\frac{df}{dE}\right)\right.$$

dE) contributions to the observable transport properties (σ, S).

Figure 9A:
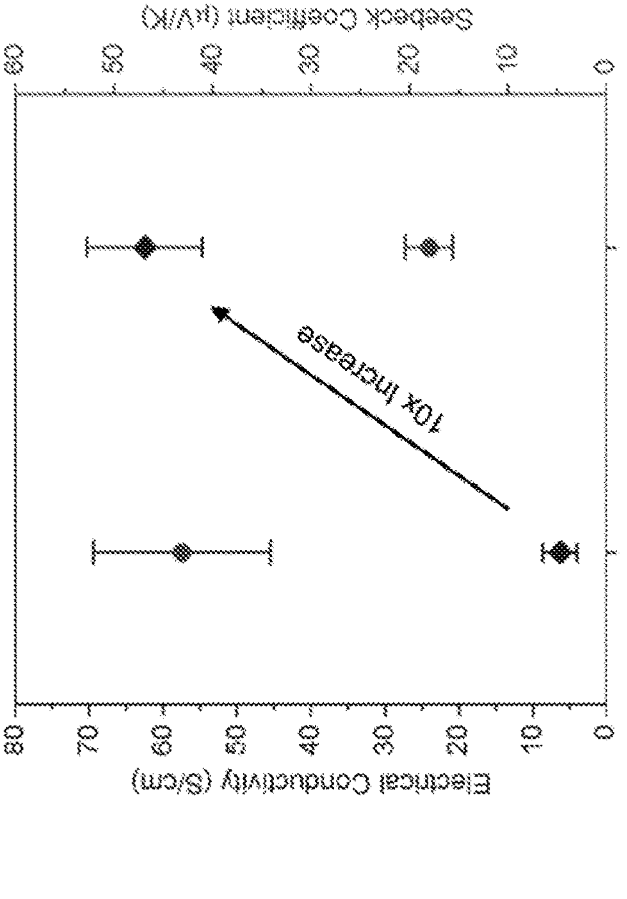
FIGS. 9A and 9B illustrate the relationship between electrical conductivity and Seebeck coefficient, and the relationship between Fermi energy level and localization energy for conductive polymer materials, in accordance with some examples of the present disclosure.

FIG. 9A and Table I show that chemically doping P(BOE)-D can result in a marked increase to 6.1 S/cm. Upon doping P(OH)-D with $FeTos_3$, FIG. 9A shows that σ increases to 62.5 S/cm, a ~10-fold increase from the alkyl parent polymer. This increase in σ, due to removing the electrically insulative side chains and concomitantly increasing the film density, is consistent with the results from both the effective medium and improved molecular overlap hypotheses, without wishing to be bound by any particular scientific theory.

Figure 9B:
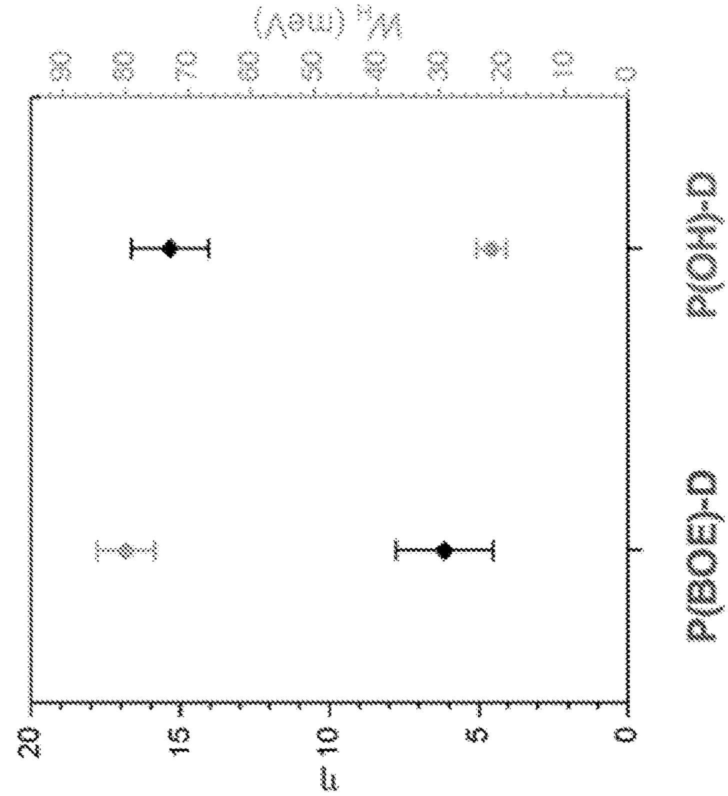
Figure 10:
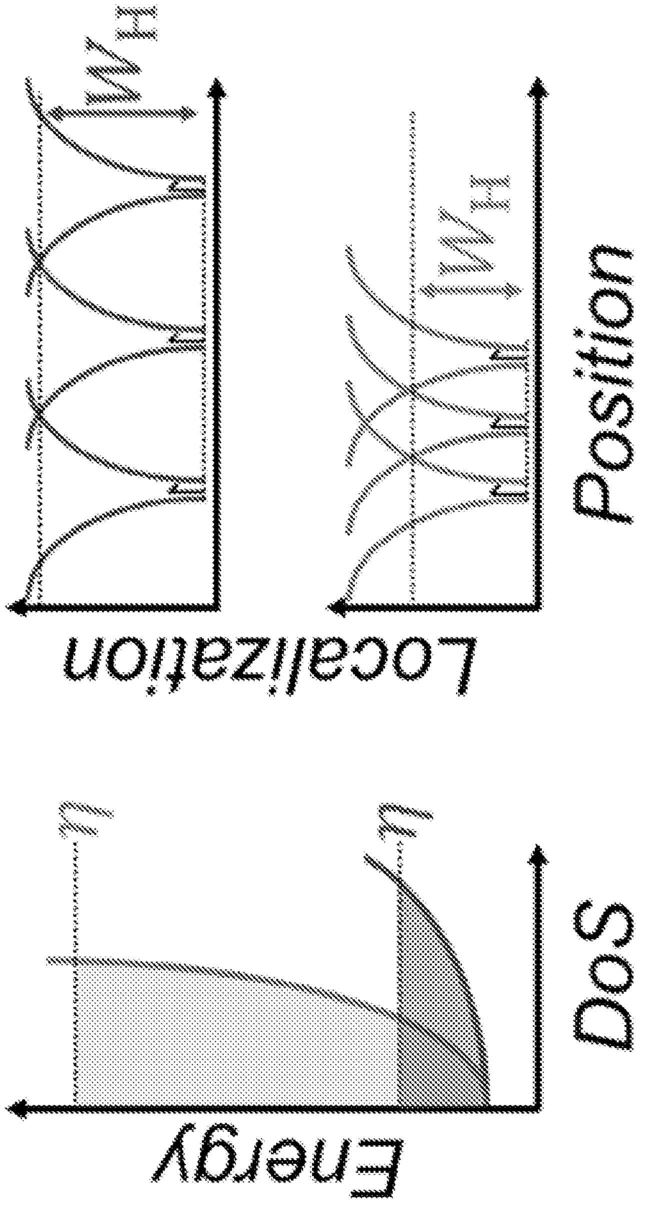
FIG. 10 is a plot illustrating the effect of side chain removal on conductive polymer materials, in accordance with some examples of the present disclosure.

FIG. 9A shows that as P(BOE)-D can be hydrolyzed to P(OH)-D, S can decrease from +45.9 μV/K to +18.5 μV/K. Effective medium and percolation models alone cannot explain this decrease in S. Therefore, without wishing to be bound by any particular scientific theory, the decrease in S can be evaluated using the SLoT framework, which accounts for how the energetic distribution of charge carriers affects the resulting observable transport properties. Through the SLoT model (Eq. 3), this decrease in S can equate to an increase in η from 6.15 to 15.4 (FIG. 9B), which can be physically interpreted as charge carriers occupying higher energy levels with respect to the transport edge (FIG. 10). Furthermore, FIG. 10 illustrates that this increase in n can be attributed to either an increase in the carrier density and/or a change in the density of electronic states. Both heavily doped P(BOE)-D and P(OH)-D can have a similar number of charge carriers per thiophene ring and extent of oxidation (c~0.3 to 0.4), as measured by XPS measurements, but P(OH)-D films are more densely packed, as observed via profilometer measurements, which is consistent with the closer d spacings from GIWAXS. The P(OH)-D films can have a greater volumetric carrier density compared to P(BOE)-D films, ~$9.8\times10^{20}$ and ~$4.9\times10^{20}$ carriers/$cm^3$, respectively. Therefore, the increase n can be at least in part attributed to the increase in n, and this is visualized as filling the electronic states with charge carriers in FIG. 10. Lastly, side chain removal could change the electronic structure and increase electronic bandwidth as the molecular orbitals better overlap (closer π-π spacing seen in GIWAXS), and this is visualized as a changing density of electronic states shape in FIG. 10.

Figure 11:
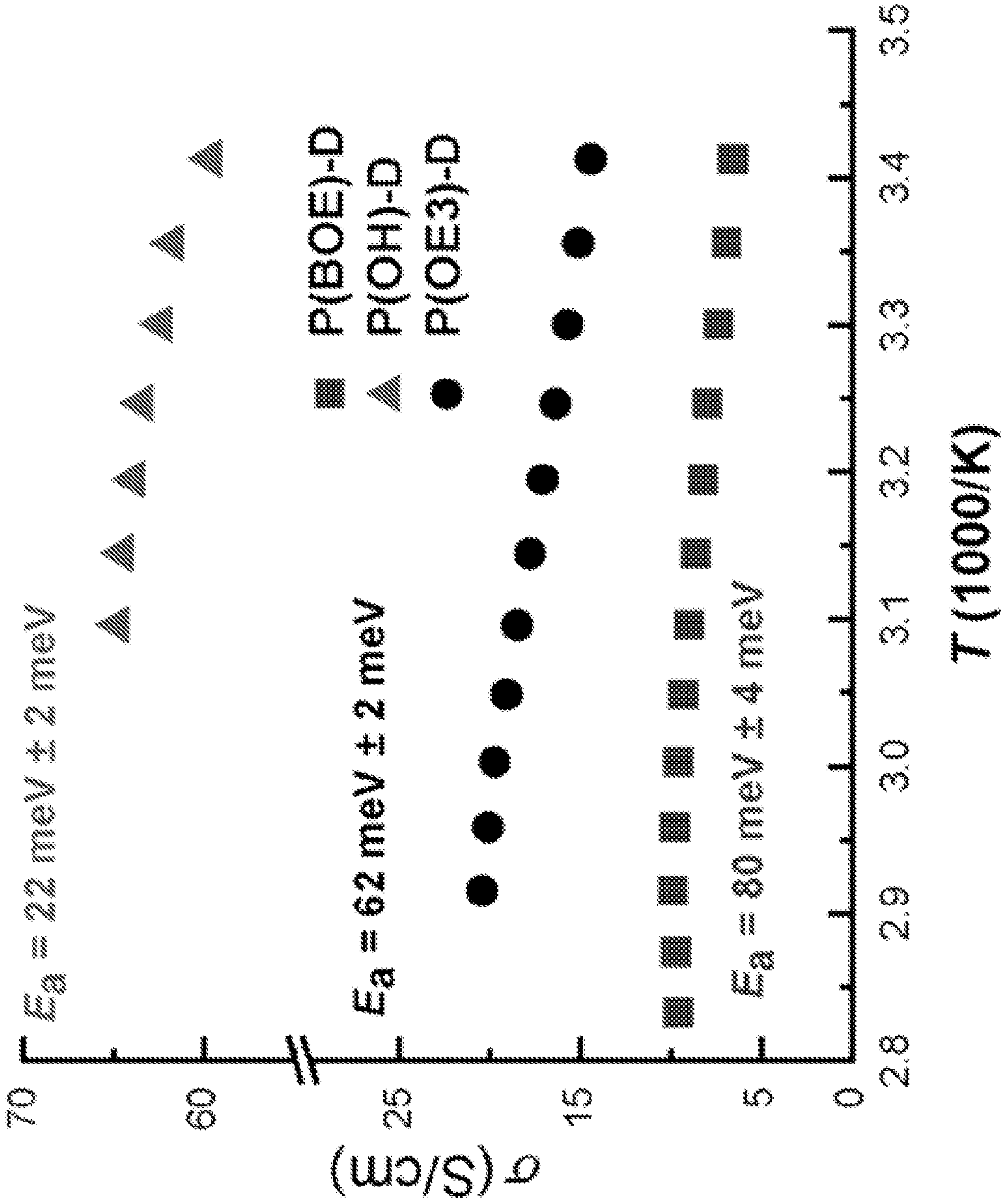
FIG. 11 is a plot illustrating electrical conductivity as a function of temperature for conductive polymer materials, in accordance with some examples of the present disclosure.

$W_H$ can be thought of as arising from spatial separation and electrostatic interactions, which localize charge carriers in potential energy wells, as illustrated in FIG. 10. These potential wells can preclude delocalized transport, but the energetic depth of these wells can decrease as the wells increasingly overlap with increasing carrier density. Although the increase in η and η can explain some of the increase in electrical conductivity (by a factor of 1.1-2.5 times), these terms alone cannot explain the observed ten-fold increase in electrical conductivity. The additional increase in electrical conductivity can be attributed to the decreased charge carrier localization, which can be calculated with the SLoT model using temperature dependent measurements from room temperature up to ~80° C. as shown in FIG. 11. $W_H$ can be 80 and 22 meV for P(BOE)-D and P(OH)-D, respectively. Notably, $W_H$ oftentimes decreases with increasing doping (e.g., increasing number of oxidized rings, c), but $W_H$ presently can decrease with increasing carrier density at a nearly constant doping level. Furthermore, because $W_H$ is located within the Arrhenius-like expression for σ, this ~4 times difference in $W_H$ results in ~9 times increase in σ at 300K.

Figure 12:
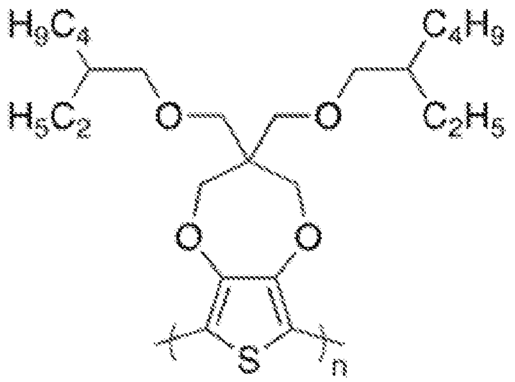
FIG. 12 illustrates a reaction scheme for making a conductive polymer material, in accordance with some examples of the present disclosure.
Figure 12:
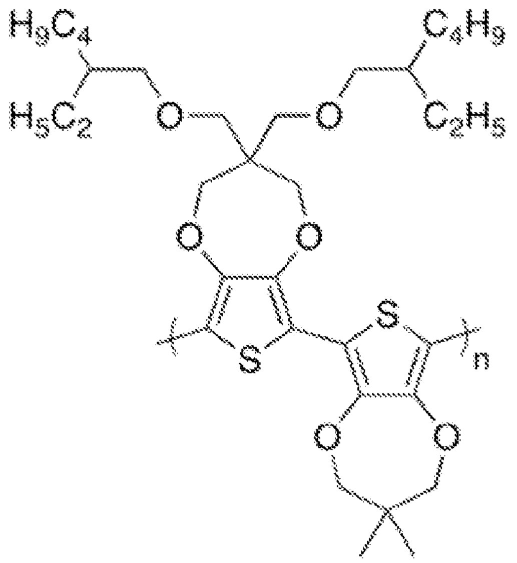
Figure 12:
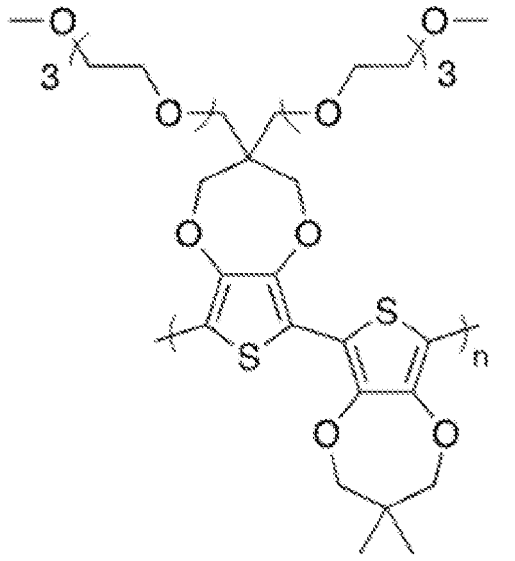
Figure 12:
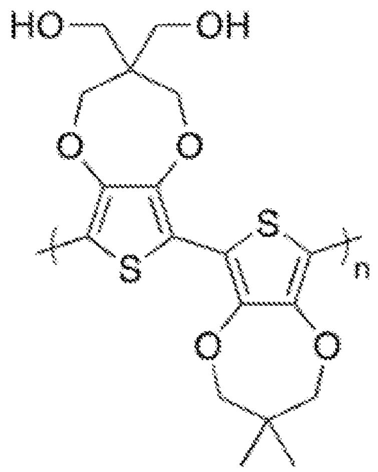

With a quantified physical explanation of the effects of side chain removal on the charge transport properties, further comparisons can be performed to understand the relative effect of this side chain removal method. Contrasting P(OH)-D to comparable ProDOT-based polymers, as shown in FIG. 12, can better illustrate the broader structure-property relationships. Films of these additional polymers can be cast via blade coating and doped in a similar manner to P(BOE)-D.

Figure 13:
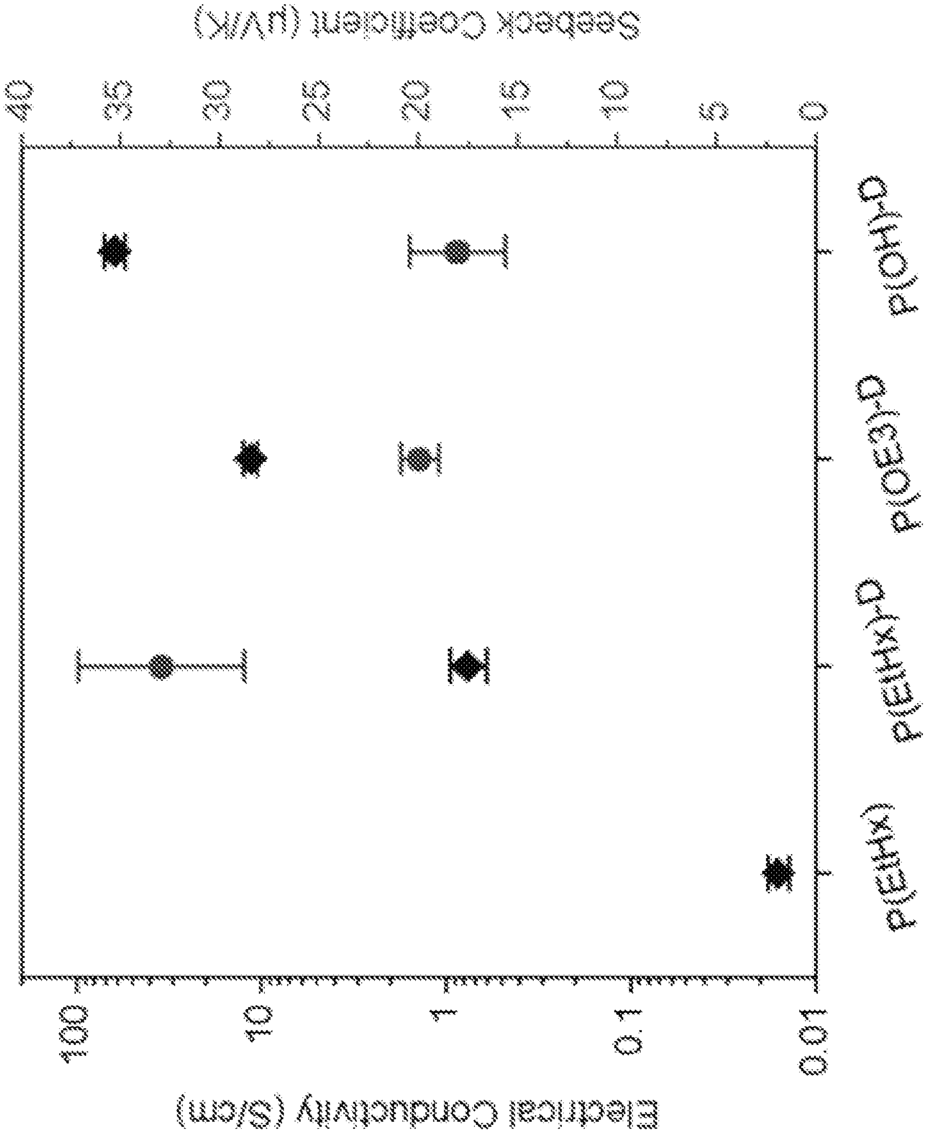
FIG. 13 illustrates the relationship between electrical conductivity and Seebeck coefficient for conductive polymer materials, in accordance with some examples of the present disclosure.

$FeTos_3$ doping the 2-ethylhexyloxymethyl ProDOT homopolymer (P(EtHx)) can result in films with a low σ of 0.016±0.0022 S/cm, as shown in FIG. 13. Introduction of a non-alkylated spacer unit, DMP, can increase the doped σ to 0.77±0.17 S/cm for P(EtHx)-D and to 6.1±2.9 S/cm for P(BOE)-D. This is a comparable increase to substitution of the branched chain for a linear alkyl or glycol and is consistent with the benefit of spacers for high solid-state conductivity. The relatively lower σ of P(EtHx)-D compared to P(BOE)-D can be attributed to poor film quality due to the low solubility provided by the 2-ethylhexyl chains in combination with the spacer unit. Introduction of a linear oligoether chain in conjunction with a spacer unit, yielding P(OE3)-D, can lead to an order of magnitude increase in σ to 11±0.92 S/cm. Finally, replacement of the large polar chains of P(OE3)-D with the small polar alcohol functionality can increase σ to 62.5±7.8 S/cm.

The Seebeck coefficient of P(EtHx) was not determined as the low σ of the film hampered this measurement. However, with the DMP spacer unit incorporated in P(EtHx)-D, S becomes observable. S continues to decrease with increasing σ from P(EtHx)-D (+33 μV/K) to P(OE3)-D (+20 μV/K), consistent with the expected anticorrelation between S and σ. However, both P(OE3)-D and P(OH)-D have similar S of ~+20 μV/K, but their σ values are substantially different (11 vs. 62 S/cm). Within the context of the SLoT model, having the same S necessitates having the same η value, so to better understand why P(OE3)-D and P(OH)-D have large differences in σ but comparable S values, XPS can be used to calculate the extent of oxidation and estimate the carrier densities.

Figure 14:
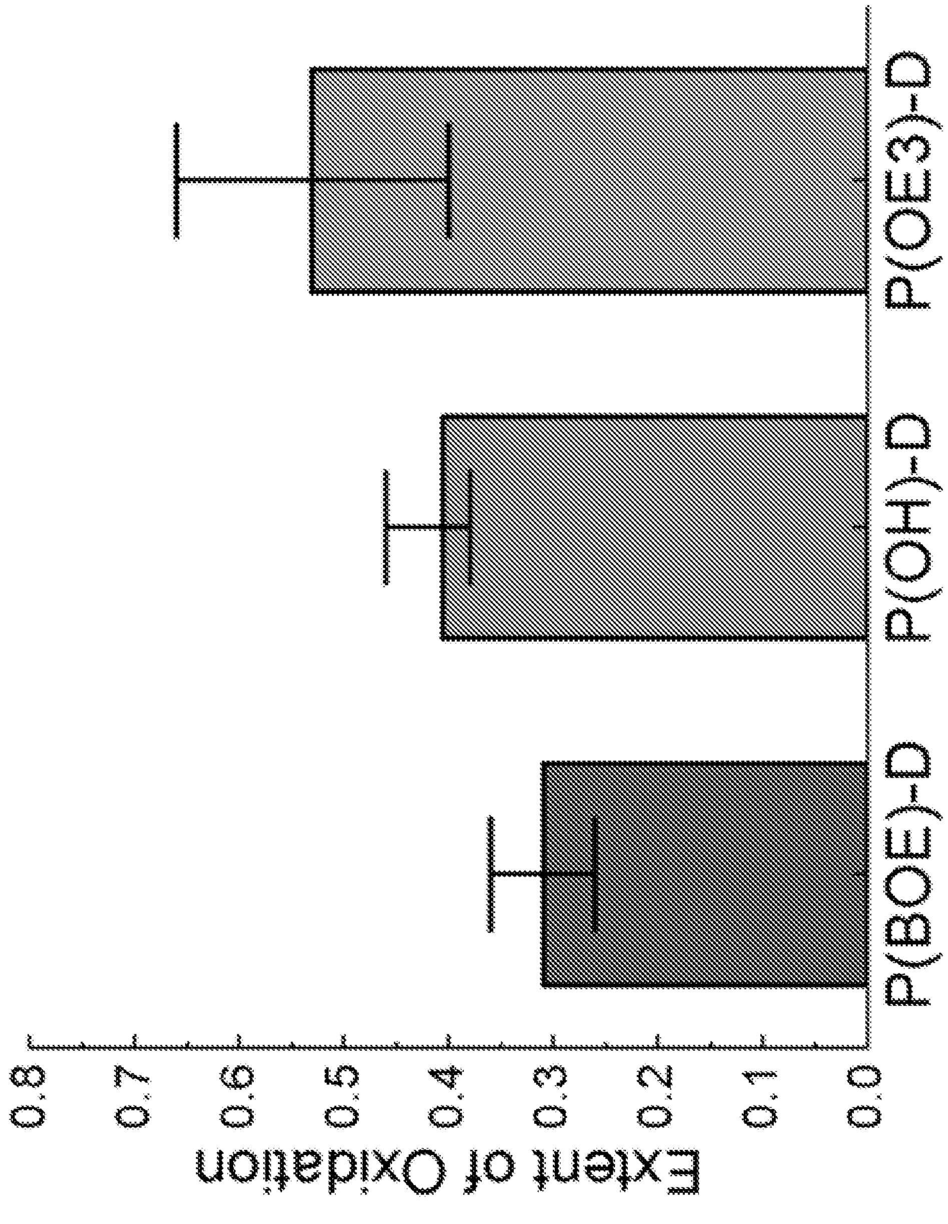
FIG. 14 illustrates the degree of doping for conductive polymer materials, in accordance with some examples of the present disclosure.

Doped P(OE3)-D films can have a doping ratio of 0.5, or one charge for every two thiophene rings in the backbone, which is slightly higher than P(OH)-D films (0.4), see FIG. 14. Despite this increased carrier ratio, P(OE3)-D can have a carrier density of $9\times10^{20}$ carriers/$cm^3$ (using the P(OE3)-D repeat unit molecular weight of 689 g/mol and an approximate density of 1 g/$cm^3$), which can be comparable to that of P(OH)-D. Therefore, the similar carrier densities and η values do not contribute to the significant differences in σ. P(OE3)-D potentially can have an increased carrier ratio and extent of oxidation due to improved anion accommodation in the high dielectric oligoether side chains, as the oxidation potential of P(OE3)-D (−0.46 V vs $Fc/Fc^+$) is similar to that of P(OH)-D. Lastly, using temperature dependent thermoelectric measurements, $W_H$ can be be 62 meV for P(OE3)-D (FIG. 11), which is ~2.8 times higher than P(OH)-D and therefore dominantly responsible for the approximately six-fold difference in σ. Ultimately, this disparity further demonstrates that the higher σ of P(OH)-D films can be due to removal of insulating material, increased active material density, and decreased carrier localization and not simply more efficient doping or a potential increase in local dielectric of the polymer.

ProDOT copolymerized with EDOT and its dimer, biEDOT, can be used to evaluate the potential of this methodology with optimized repeat unit structures. EDOT chemistries have demonstrated the propensity to increase the electrical conductivity of various copolymer systems. For example, a polymer consisting of a 2-hexyldecyloxymethyl functionalized ProDOT copolymerized with biEDOT [termed P(HD)-E2] can produce films with σ values of ~250 S/cm following chemical doping. Substitution of the alkylated ProDOT for a branched oligoether version increases this σ (after thickness and annealing optimization) up to 430±60 S/cm when doped with $FeTos_3$.

Figure 15:
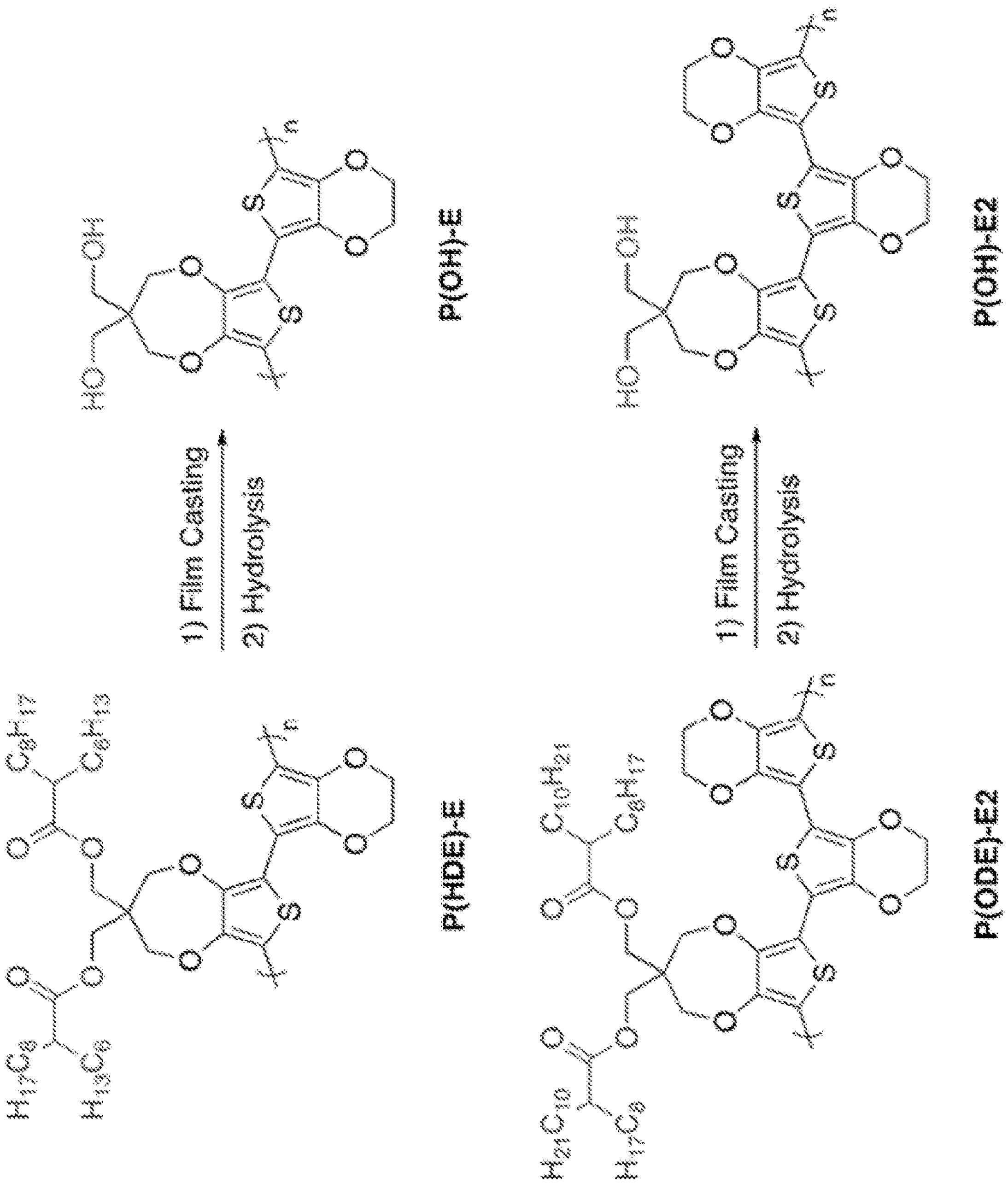
FIG. 15 illustrates a reaction scheme for making a conductive polymer material, in accordance with some examples of the present disclosure.
Figure 16:
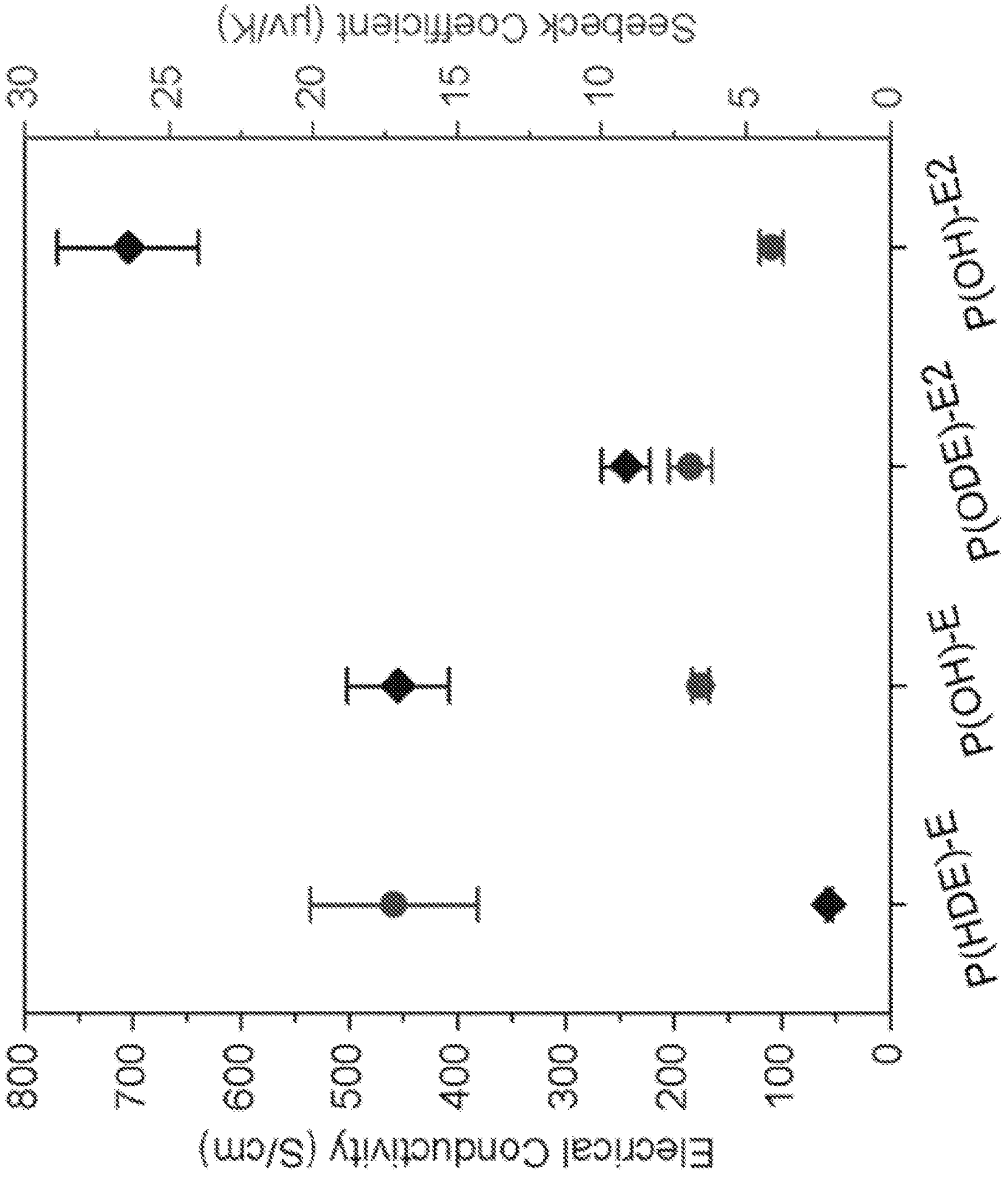
FIG. 16 illustrates the relationship between electrical conductivity and Seebeck coefficient for conductive polymer materials, in accordance with some examples of the present disclosure.

The synthesis of ProDOT-alt-EDOT and ProDOT-alt-biEDOT copolymers with cleavable side chains via DHAP are illustrated their chemical structures before and after hydrolysis shown in FIG. 15. Here a simple ProDOT-alt-EDOT copolymer can be functionalized with 2-hexyldecyl ester (HDE) side chains. This material, P(HDE)-E, can be highly soluble with a $M_n$ of 55 kg/mol and yields an initial σ of 56.2±2.9 S/cm when doped (see FIG. 16). Hydrolysis of the side chains and subsequent doping of this material can increase σ to 455±47 S/cm for films. Replacement of the EDOT unit for a biEDOT can lower the solubility of the polymer backbone and can be found to require larger 2-octyldodecyl ester (ODE) side chain to prepare a polymer with similar solubility and acceptable molecular weight ($M_n$ of 12 kg/mol). This new PE2 derivative, P(ODE)-E2, shows σ values that are not substantially different than the previously reported P(HD)-E2 when cast and doped in a comparable manner (244±22 S/cm). However, the form of this material, P(OH)-E2, has an exceptional σ of 704±65 S/cm, the highest of any known solution-processed XDOT. Lastly, S shows the expected trends; as EDOT concentration increases and as side chains are removed, S decreases, likely indicating a change in the electronic structure, as discussed previously. Ultimately, these systems demonstrate that the cleavable design strategy can be broadly applicable to different polymer chemistries and can be used to generate materials with exceptional transport properties without compromising processability.

In summary, by removing electrically insulative side chains from a selection of conjugated polymers, the electrical conductivity of doped solvent resistant films can be significantly increased. For a model polymer system, P(BOE)-D hydrolyzed to P(OH)-D, a reduction in film thickness, observed via optical profilometry, can be due to side chain removal and densification of redox active material upon hydrolysis and washing. Electrochemical measurements indicate that the same amount of redox active material can be present before and after hydrolysis, demonstrating this method does not compromise the integrity of the backbone π system. While doped P(BOE)-D films yield modest σ values of ~6 S/cm, side chain hydrolysis can increase σ to >60 S/cm in P(OH)-D. Electrochemical, XPS, and GIWAXS results indicate the higher σ is not primarily due to increased doping levels (e.g., extents of oxidation), but results from a combination of factors including removal of insulating materials, reduced π-π stacking distances, and increased charge carrier volumetric density. These factors can also decrease the Seebeck coefficient from +46 μV/K to +19 μV/K, and this decrease cannot be explained using percolation or effective medium models alone. To better contextualize the changes in electrical conductivities and Seebeck coefficients due to side chain removal, the SLoT model can be used. The SLoT model shows that side chain removal can increase the Fermi energy level with respect to the transport edge by increasing the carrier density and possibly altering the electronic structure, and that side chain removal decreases charge carrier localization by increasing charge carrier density. Notably, carrier localization can be reduced by reducing the volume over which the carriers reside, rather than the more typical route of increasing the extent of oxidation.

This methodology offers several benefits to conjugated polymer device preparation. As the parent ester polymer is highly soluble, high molecular weight materials can be synthesized and detailed characterizations can be performed to fully understand the polymer structure. The size of the solubilizing chains can be tuned to allow for optimal processing without the detrimental device-level effects that typically arise from excessive side chains. Moreover, as the hydroxyl functionalized polymer films are insoluble in both organic and aqueous solvents, selection of an orthogonal solvent for deposition of subsequent layers is unnecessary, streamlining the construction of various devices.

Comparisons of charge transport properties to analogous backbone structures bearing different side chain motifs and manipulation of the repeat unit structure can allow for contextualization of this methodology in the broader scope of conjugated polymer design. Solvent resistant P(OH)-D films doped with ferric tosylate can yield the highest solid-state electrical conductivity for an entirely ProDOT-based polymer. Alternatively, introduction of EDOT units into the copolymer structure can lead to a significant increase in, with P(OH)-E and P(OH)-E2 having the highest $\sigma$ values of any reported material prepared by C—H activation. Additionally, these systems can significantly outperform any oligo ether/glycol functionalized polymer.

The P(BOE)-D sample used herein can be prepared via direct heteroarylation polymerization (DHAP) with a molecular weight, as estimated via gel permeation chromatograph (GPC) vs. polystyrene standards in $CHCl_3$, of $M_n$=72.6 kg/mol and Đ=2.3. The polymer composition can be confirmed by elemental analysis and the repeat unit structure can be confirmed by proton NMR. P(EtHx) ($M_n$=12.4 kg/mol, Đ=1.8),[4] P(EtHx)-D ($M_n$=12.5 kg/mol, Đ=1.5) and P(OE3)-D (Mn=22.5 kg/mol, Đ=2.0) can be prepared as previously described.

Conventional solvents (methanol, acetone, hexane, ether, $CHCl_3$, etc.) can be obtained from VWR (reagent grade) and used as received. DMAc (HPLC grade), sulfuric acid (95-98%, ACS grade), potassium carbonate (anhydrous, ACS grade), potassium hydroxide (KOH, reagent grade), and acetonitrile (ACN, ≥99.8% for HPLC) can be obtained from VWR and used as received. $Pd(OAc)_2$ (47.5% Pd), chromium (VI) oxide (99%, Alfa Aesar), and N-bromosuccinimide (NBS, 99%, BTC) were used as received. 2-Hexyldecanoic acid (96%), 2-octyldodecanol (97%), pivalic acid (99%), ferric tosylate hexahydrate ($FeTos_3$, technical grade), hydrazine (anhydrous, 98%), and chlorobenzene (CB, 99.8%, anhydrous), can be obtained from Sigma-Aldrich and used as received. 3,4-dimethoxythiophene can be supplied by BASF and used as received. EDOT can be supplied by Biosynth and distilled prior to use. BIEDOT can be supplied by BASF and recrystallized from ethanol and dried under vacuum before use.

3,4-dimethoxythiophene (33.3 g, 0.231 moles, 1 eq.), 2,2-bis(bromomethyl)-1,3-propanediol (73.1 g, 0.279 moles, 1.2 eq.), and pTSA (2.2 g, 0.012 moles, 0.05 eq.) can be added to a 1 L round bottom flask fitted with a mechanical stirrer. ~300 mL of toluene can be added, and the setup can be purged with argon. The reaction mixture can be heated to 95° C. for 48 hours. The resulting dark green mixture can be filtered through a silica pad, and the solvent can be removed via a rotary evaporation setup. The solid material can be dry packed onto silica using DCM. This can be added to a prepacked column with hexanes. The column mobile phase can be ramped from 100% hexanes to 20% DCM in hexanes. The solvent can be removed to yield a colorless oil. Ethanol (~500 mL) can be added, and the mixture can be heated to boiling. This mixture can be allowed to cool overnight and yielded the product as a white solid that can be dried under high vacuum. Product can be obtained in an amount of 44.65 g (57%) as a white solid. $^1H$-NMR (700 MHz, $CDCl_3$, 25° C.) δ 6.49 (s, 2H), 4.10 (s, 4H), 3.61 (s, 4H).

EDOT (6.100 g, 0.043 moles, 1 eq.) and ~50 mL DMAc can be added to a 100 mL round bottom flask. The solution can be cooled to −8° C. (via a salt and ice bath) under argon. NBS (16.81 g, 0.094 moles, 2.2 eq.) can be added all at once, and the reaction can be sealed. The reaction mixture can be covered in foil to protect it from light and can be allowed to warm to ambient temperature over ~2 hours. The mixture can be filtered through a basic alumina pad and the solvent removed under vacuum. The solid can be recrystallized from ethanol by first heating it to reflux (adding just enough ethanol to fully dissolve the solid while hot) and then cooling to RT, and then chilling in a freezer. The crystalline solid can be filtered and washed with cold ethanol to yield 6.96 g (54%) of white crystals. $^1H$-NMR (700 MHZ, $CDCl_3$, 25° C.) δ 4.27 (s, 2H).

ProDOT$(CH_2Br)_2$ (5.033 g, 14.7 mmol, 1 eq.), 2-hexyldecanoic acid (11 mL, 38 mmol, 2.6 eq.), $K_2CO_3$ (6.098 g, 44 mmol, 3 eq.), and ~140 mL of DMAc can be added to a 300 mL round bottom flask and covered with argon. The reaction can be heated to 100° C. overnight. The reaction mixture can then be extracted with diethyl ether and brine. The organic phases can be washed with saturated $NaHCO_3$/$H_2O$ (4 times). After concentrating the organic phase, the resulting oil can be purified by column chromatography, ramping from hexanes to 20% ethyl acetate in hexanes. Following drying under high vacuum overnight, the product can be obtained as 9.825 g (91%) of a pale (nearly colorless) yellow oil. $^1H$-NMR (700 MHZ, $CDCl_3$, 25° C.) δ 6.46 (s, 2H), 4.19 (s, 4H), 4.04 (s, 4H), 2.33 (m, 2H), 1.56 (m, 4H), 1.45 (m, 4H), 1.33-1.04 (br, 48H), 0.87 (m, 12H). $^{13}C$-NMR (126 MHz, $CDCl_3$, 25° C.) δ 176.07, 149.18, 105.56, 72.68, 62.69, 53.57, 45.83, 32.44, 32.00, 31.79, 29.70, 29.56, 29.35, 27.47, 22.80, 14.20. HR-MS (ESI) m/z calculated for $C_{41}H_{72}O_6S$ (M+H): 693.5122, found 693.5104.

$CrO_3$ (25 g) can be dissolved in 25 mL of concentrated $H_2SO_4$. 75 mL of DI $H_2O$ can be slowly added to this solution at ~0° C. while stirring. The resulting deep red solution (Jones reagent) can be added to an addition funnel and set aside for later.

2-Octyl-dodecanol (10.2 g) and 150 mL of acetone can be placed in a 500 mL round bottom flask. The Jones Reagent (~2.5 M, all 100 mL) can be added dropwise with the temperature held at 0° C. by an ice bath. The reaction can be stirred for 2 hours. The reaction can be slowly quenched with isopropanol until the solution is a deep green color (full conversion of Cr (VI) to Cr (III)). The reaction mixture can be extracted with diethyl ether and washed with 1 M HCl three times (with a small amount of brine added to break emulsion) and then extracted with brine. The organic layer can be filtered through a large Celite® pad. After the solvent is removed, the product can be obtained as an oil that solidified to a light purple solid after drying under vacuum overnight 10.3 g (96%). $^1$H-NMR (700 MHZ, $CDCl_3$, 25° C.) δ 10.79 (bs, 1H), 2.34 (m, 1H), 1.61 (m, 2H), 1.46 (m, 2H), 1.37-1.09 (br, 28H), 0.92-0.88 (t, 6H).

ProDOT($CH_2Br)_2$ (3.568 g, 10.4 mmol, 1 eq.), 2-octyl-dodecanoic acid (7.163 g, 23 mmol, 2.2 eq.), $K_2CO_3$ (4.438 g, 31 mmol, 3 eq.), and ~40 mL of DMAc can be added to a 100 mL round bottom flask and covered with argon. The reaction can be heated to 100° C. overnight. The reaction mixture can then be extracted with diethyl ether and brine. The organic phases can be washed with saturated $NaHCO_3/H_2O$, saturated $K_2CO_3/H_2O$, and brine. After concentrating the organic phase, the resulting oil can be purified by column chromatography, ramping from hexanes to 20% ethyl acetate in hexanes. Following drying under high vacuum overnight, the product can be obtained as 7.744 g (92%) of a colorless oil. $^1$H-NMR (700 MHZ, $CDCl_3$, 25° C.) δ 6.46 (s, 2H), 4.19 (s, 4H), 4.04 (s, 4H), 2.34 (m, 2H), 1.57 (m, 4H), 1.45 (m, 4H), 1.31-1.16 (br, 60H), 0.88 (m, 12H). $^{13}$C-NMR (126 MHz, $CDCl_3$, 25° C.) δ 176.08, 149.19, 105.56, 72.69, 62.69, 46.15, 45.84, 32.44, 32.07, 32.01, 29.72, 29.58, 29.44, 27.60, 22.84, 14.27. HR-MS (ESI) m/z calculated for $C_{49}H_{88}O_6S$ (M+H): 805.6374, found 805.6373.

ProDOT(ODE) (3.518 g, 4.4 mmol, 1 eq.) and 50 mL DMAc can be added to a 100 mL RBF and cooled to ~0° C. and added NBS (1.718 g, 9.6 mmol, 2.2 eq.) all at once and placed under argon. The organic layer can be extracted with diethyl ether and washed with saturated $NaHCO_3/H_2O$ and brine. After concentrating the organic phase, the resulting oil can be purified by flash chromatography, ramping from hexanes to 20% ethyl acetate in hexanes. The product can be obtained as 4.014 g (95%) of a colorless oil. $^1$H-NMR (700 MHZ, $CDCl_3$, 25° C.) δ 4.19 (s, 4H), 4.12 (s, 4H), 2.34 (m, 2H), 1.57 (m, 4H), 1.45 (m, 4H), 1.35-1.13 (br, 56H), 0.87 (t, 12H). $^{13}$C-NMR (126 MHz, $CDCl_3$, 25° C.) δ 176.15, 146.72, 91.79, 73.39, 62.74, 45.98, 32.58, 32.28, 32.15, 29.98, 29.90, 29.76, 29.68, 27.80, 22.98, 14.40. HR-MS (ESI) m/z calculated for $C_{49}H_{86}Br_2O_6S$ (M+H): 961.4585, found 961.4571.

ProDOT (HDE) (0.8108 g, 1.0 eq.), EDOT-$Br_2$ (0.3512 g, 1.0 eq.), palladium (II) acetate (0.007 g, 3 mol %), pivalic acid (0.032 g, 0.3 eq.), and potassium carbonate (0.408 g, 2.5 eq.) can be added to a 50 mL round bottom flask equipped with stir bar. 12 mL of DMAc can be added to dissolve the contents, and the RBF can be purged via bubbling argon. The RBF can be lowered into an oil bath heated to 50° C., and the heat can then be ramped up to 110° C. over ~20 minutes. The reaction can stir vigorously for 2 hours. After the flask is removed from the oil bath and allowed to cool to room temperature, the polymer can be precipitated into stirring methanol ($CHCl_3$ can be used to assist transferring the polymer). The precipitate can be filtered into a soxhlet extraction thimble and washed with methanol, acetone, ethyl acetate, hexanes, and finally dissolved into $CHCl_3$. The washings can be conducted until color is no longer observed during extraction, or at least 2 hours if no color is observed. After dissolution from the thimble, the $CHCl_3$ can be concentrated via rotary evaporation and then precipitated into ~250 mL of methanol. The precipitate can be vacuum filtered, using a Nylon pad (with a pore size of 20 μm) as the filter, washed with methanol, and briefly allowed to air dry. The dried material can be collected into a vial and dried under vacuum. The polymer can be obtained as a dark purple solid in 79% yield (0.769 g). $^1$H-NMR (700 MHZ, $C_2D_2Cl_4$, 25° C.) δ 4.34 (br, 12H), 2.38 (s, 2H), 1.66 (m, 14H), 1.24 (br, 30H), 0.85 (m, 12H). The backbone protons are poorly resolved due to low levels of air oxidation (doping) of the polymer in solution. Analysis calculated for $C_{47}H_{74}O_8S_2$ C 67.91, H 8.97, S 7.71, Found C 67.31, H 9.10, S 7.76. $M_n$=55 kg/mol, Đ=2.0, vs. PS in $CHCl_3$ at 40° C. vs. PS standards.

ProDOT(ODE)-$Br_2$ (0.8550 g, 1.0 eq.), biEDOT (0.2507 g, 1.0 eq.), palladium (II) acetate (0.006 g, 3 mol %), pivalic acid (0.024 g, 0.3 eq.), and potassium carbonate (0.303 g, 2.5 eq.) can be added to a 50 mL round bottom flask equipped with stir bar. 9 mL of DMAc can be added to dissolve the contents, and the RBF can be purged via bubbling argon. The RBF can be lowered into an oil bath heated to 50° C., and the heat can then be ramped up to 110° C. over ~20 minutes. The reaction can be allowed to stir vigorously for 2 hours. After the flask is removed from the oil bath and allowed to cool to room temperature, the polymer can be precipitated into stirring methanol ($CHCl_3$ can be used to assist transferring the polymer). The precipitate can be filtered into a soxhlet extraction thimble and washed with methanol, acetone, ethyl acetate, hexanes, and finally dissolved into $CHCl_3$. The washings can be conducted until color is no longer observed during extraction, or at least 2 hours if no color is observed. After dissolution from the thimble, the $CHCl_3$ can be concentrated via rotary evaporation and then precipitated into ~250 mL of methanol. The precipitate can be vacuum filtered, using a Nylon pad (with a pore size of 20 μm) as the filter, washed with methanol, and briefly allowed to air dry. The dried material can be collected into a vial and dried under vacuum. The polymer can be obtained as a dark blue (metallic looking) solid in 12% yield (0.117 g). $^1$H-NMR (700 MHZ, $C_2D_2Cl_4$, 25° C.) δ 1.64 (br, 47H), 1.26 (br, 41H), 0.86 (m, 12H). The backbone protons (e.g., those of the ProDOT and EDOT bridges) are not observed due to a significant degree of air oxidation (doping) of the polymer in solution. Analysis calculated for $C_{61}H_{94}O_{10}S_3$ C 67.62, H 8.74, S 8.88, Found C 65.88, H 8.60, S 8.77. $M_n$=12 kg/mol, Đ=1.2, vs. PS in $CHCl_3$ at 40° C. vs. PS standards.

Films for electrical conductivity (σ) and Seebeck(S) measurements can be prepared on 1×1 cm glass substrates (500 μm thick) cleaned by sonication in deionized water, acetone, and isopropanol. Blade coated films can be prepared using a Zehntner Testing Instruments blade coater (a ZAA 2300 equip with a ZUA 2000 blade) with blade height and speed adjusted for each polymer. An IR-lamp to heat placed about the blade coater can be used to heat the glass substrates to ~60° C. All film preparation and doping procedures can be performed in air.

P(BOE)-D can be dissolved in 1:1 $CHCl_3$ and CB at a total concentration of 30 mg/mL with an absolute blade height of 750 μm (250 μm above the glass substrate). Thin films for electrical measurements can be prepared via blade coating using 20 μL of the polymer solution at a blade speed of 40 mm/s to yield films of ~500-1000 nm thickness. P(EtHx) and P(EtHx)-D can be blade coated in a like manner to P(BOE)-D, with concentrations of 30 mg/mL in CB, blade speed of 40 mm/s and 20 mm/s, respectively. P(OE3)-D can be blade coated from a 15 mg/mL solution of 1:1 $CHCl_3$ and CB with a blade speed of 40 mm/s. P(HDE)-E can be blade coated from a 30 mg/mL solution of 1:1 $CHCl_3$ and CB with a blade speed of 40 mm/s. P(ODE)-E2 can be blade coated from a 30 mg/mL solution in 1:1 $CHCl_3$/CB with a blade speed of 60 mm/s and a lower blade height of 700 μm (200 μm above the glass substrate) for optimal film quality.

For electrical measurements, four platinum contact pads (1 mm×1 mm, ~50 nm thick) can be deposited on the prepared films using a shadow mask in a home-built sputter deposition. Gold contact pads can be used with a chromium adhesive layer; however, replacement of this system for platinum pads makes no difference to the measurements. The thickness of each polymer film can be determined after σ and S measurements via profilometry.

Films can be placed in a 2 M KOH bath (KOH in methanol) for 2 hours and heated at ~50° C. For hydrolyzed and doped films, hydrolysis can be performed first to cleave side chains followed by washing with clean methanol. 2 hours of hydrolysis time can be sufficient for films with a thickness of up to ~1.3 μm.

For films used in Van der Pauw measurements; doping can be performed by dropping 0.1 mL of ferric tosylate solution [30 mg/mL (44 mM) of $(FeTos)_3 \cdot 6H_2O$ in ACN] on the films and allowing it to sit for 60 seconds. Clean ACN can then be dropped on the film twice to remove excess dopant. The films air dried for a few minutes before placing under high vacuum for 15 minutes. Films can then be measured directly. For films used in UV-vis and thermal conductivity measurements, the films can be dipped into the ferric tosylate solution for 30 seconds, washed with clean solvent, and dried under high vacuum.

The molecular weight and dispersity of the polymer can be obtained using a chloroform GPC at 40° C. calibrated vs. polystyrene standards. The NMR spectrum can be collected on a Bruker 700 MHz instrument using $CDCl_3$ as the solvent (25° C., 32 scans for 1H and 64 scans for 13C) for intermediates and monomers and $C_2D_2Cl_4$ as the solvent (40° C., 256 scans) for polymers. 2 microliters of each sample can be diluted 10000× in isopropanol with 0.5 mM ammonium formate. The samples can be ionized by positive mode ESI using a Thermo Scientific QEHF mass spectrometer.

The CV and DPV measurements can be performed using a model 273A EG&G PAR potentiostat/galvanostatic controlled by CorrWare. The electrical potential in the three-electrode cell setup can be measured using a $Ag/Ag^+$ reference electrode (10 mM $AgNO_3$ in 0.5 M $TBAPF_6$/ACN, $E_{1/2}$ for ferrocene: 69 mV), the counter electrode can be a platinum flag, and with 0.5M $TBAPF_6$ in acetonitrile (ACN) serving as the electrolyte media. Films can be prepared by drop casting 2 μL of a 4 mg/mL solution (resulting in 8 μg of polymer on the electrode) of P(BOE)-D in $CHCl_3$ onto a glassy carbon button electrode (area=0.07 $cm^2$). Films can be electrochemically cycled for 10 scans to "break in" the films prior to collecting the data. Film hydrolysis can be performed by simple dipping the electrode into the warm KOH/methanol solution.

The thicknesses of films used for electrical conductivity and GIWAXS measurements can be determined using a Bruker DektakXT profilometer. The change in film thickness via hydrolysis and doping can be determined using a Filmetrics Profilm 3D optical profilometer using films prepared in an identical manner to those used in conductivity measurements. Reported film thicknesses, for conductivity and thickness change measurements, can be averages from 3-5 separate films with errors listed indicating one standard deviation from the mean.

For atomic force microscopy (AFM) studies, films can be cast and processed on clean glass substrates. AFM Height and phase images can be collected in standard tapping mode (~150 kHz) with a Bruker Dimension Icon AFM equipped with a Bruker RTESP-150 probe. Water contact angles can be measured via the sessile drop method performed using a ramé-hart Contact Angle Goniometer (model 210). For contact angle measurements, polymer films can be blade-coated onto clean glass substrates and processed. A 15 μL droplet of DI water can be deposited directly onto films cast on glass substrates. The droplet can be imaged immediately after deposition, and the contact angle can be determined using DROPimage Pro software. Disclosed contact angles represent the average and standard deviation from at least three separate droplets for each sample.

Tungsten tipped micromanipulators can be used to make electrical contact to the platinum contact pads, and sheet resistance can be acquired based on the four-probe Van der Pauw technique. From this, the electrical conductivity can be obtained by correcting for film thickness, as determined by profilometry. For Seebeck coefficient measurements, substrate supported films can be suspended between temperature-controlled Peltier stages (separated ~3 mm), and a series of temperature differences, up to ΔT=10° C., can be applied between the stages above and below the nominal Peltier stage temperature. The thermoelectric voltage can be measured between two contact pads on separate stages using the probe tips, with the temperature of each side of the film being measured with a K-type thermocouple in close proximity to the probe tips, while the voltage (V) and temperature data can be acquired using a Keithley 2700 DMM with a 7708 Mux card using a LabVIEW interface. The Seebeck coefficient can be extracted as the slope of the V vs. ΔT. In order to obtain temperature-dependent properties, the nominal Peltier stage temperature can be changed from 20-70° C. using temperature controllers (Model LFI-3751).

UV-vis spectra can be collected using an Agilent Technologies Cary 5000 UV-Vis-NIR Spectrophotometer controlled by Cary WinUV software. Glass can be used as a blank. Transmittance IR spectra can be collected on a Nicolet iS Fourier transform infrared spectrometer. A P(BOE)-D film can be spray cast onto a ZnSe window (12.7×2 mm, round, uncoated, EKSMA Optics) from a 4 mg/mL solution in $CHCl_3$ to obtain a 927 nm thick film (as measured by profilometry). Air can be used for the background scan, and measurements can be averaged over 32 scans. Following collection of the pristine P(BOE)-D spectrum, the film can be hydrolyzed and washed using the previously described methods and measured again to collect the spectrum of P(OH)-D.

For sample preparation, polished silicon wafers can be cleaned using acid piranha etch, rinsed with DI water and isopropanol, and dried under a nitrogen stream. Film coating, hydrolysis, and doping can be performed on these clean silicon substrates. Grazing-Incidence Wide Angle X-ray Scattering (GIWAXS) measurements can be performed. The beam energy can be 13.5 keV, and the incident angle of the measurement can be 0.12°. The sample distance can be approximately 259 mm. Scattering patterns can be calibrated using a standard sample of $LaB_6$. Raw data from scattering experiments can be processed using software packages Nika 1D SAXS29 and WAXStools in IgorPro Version 6.37. Two-dimensional intensity vs. q-spacing files can be corrected for detector geometry and film thickness (measured by profilometry), with intensity represented on a linear scale. For line-cuts, images can be reduced to 1D plots via integration of out-of-plane cake segments from (0°>χ>−15°) and analyzed using the peak fitting feature in Origin Pro 2016. D-spacing can be calculated using the equation $d=2\pi/q_z$.

XPS spectra can be recorded on a Thermo K-Alpha instrument under ultra-high vacuum (<$10^{-7}$ mbar) using an Al Kα source (1.486 keV) equipped with a charge-neutralizing flood gun. High resolution, elemental scans can be recorded at a 0.1 eV energy resolution and a pass energy of 50 eV. XPS peak deconvolution can be performed using Thermo Avantage analysis software. Each of the analyses can be performed with a Smart background: a Shirley background with the additional constraint that the background shall not exceed the intensity of the data collected. For the sulfur spectra, a doublet can be assigned for the $2p_{3/2}$ and $2p_{1/2}$ peaks due to spin-orbit coupling. The separation in peak binding energy (BE) between the $2p_{3/2}$ and the $2p_{1/2}$ is $\Delta BE=1.18\pm0.05$ eV, and the area ratios were constrained to satisfy $A(S\ 2p_{1/2})=0.511*A(S\ 2p_{3/2})$. The FWHM of each doublet can be equivalent within the same chemical species and constrained from 0.9 to 2 eV for different chemical species. Symmetric line shapes can be used with a convolution of Gaussian and Lorentzian functions, the relative proportion being 30% Lorentzian.

The pristine spectra can be deconvoluted first to serve as a reference for the doped spectra. Initially, one symmetric doublet can be assigned to the pristine spectra, corresponding to neutral thiophene. A second doublet can be assigned. The area ratios of the second doublet to the first doublet may be no greater than 0.1. The binding energies of the second doublet can vary in pristine P(BOE)-D, P(OH)-D, and P(OE3)-D, suggesting the doublet could be ascribed to multiple types of sulfur species (e.g., sulfon groups, "multi-polaronic" species) or excitation processes that result in asymmetric line shapes.

Three sulfur doublets can be used to deconvolute the doped polymer spectra, corresponding to the three chemical species present in the samples: neutral thiophene, oxidized thiophene, and tosylate anions. The binding energies of these sulfur species can be consistent with oxidized poly(dioxythiophenes) and oxidized poly(alkyl thiophenes). Extents of oxidation can be calculated using the following ratios:

$$\frac{A(S_{ox\ thio})}{A(S_{ox\ thio})+A(S_{neut\ thio})},\ \frac{A(S_{tosylate})}{A(S_{ox\ thio})+A(S_{neut\ thio})}$$

where $A(S_{ox\ thio})$ is the area of the oxidized thiophene sulfur doublets, $A(S_{neut\ thio})$ is the area of the neutral thiophene sulfur doublets, and $A(S_{tosylate})$ is the area of the tosylate sulfur doublets. In using a simplex algorithm, an initial constraint used can be that the atomic abundance of $S_{tosylate}$ and $S_{ox\ thio}$ should be equivalent. This constraint can be because there should be a counter-ion (the tosylate anion) stabilizing every charge formed along the backbone (oxidized thiophene). The constraint can then be removed after subsequent iterations to consider defects or impurities.

What is claimed is:

1. A conductive polymer material comprising conjugated electron monomer units;

wherein:

the conductive polymer material is insoluble in at least one solvent;

the conductive polymer material has a conductivity from 10 S/cm to 100,000 S/cm;

the electron monomer units have the structure of:

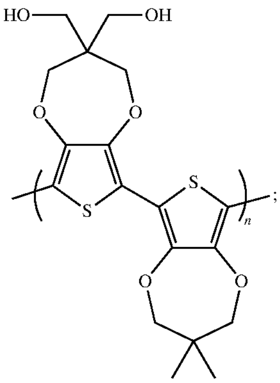

; and n is from 10 to 10,000.

2. A conductive film material comprising the conductive polymer material of claim 1.

3. The conductive polymer material of claim 1, wherein the electron monomer units are selected from the group consisting of:

electron donor monomer units substituted with a hydroxy or hydroxymethyl substituent with n=10 to 10,000 units; and electron acceptor monomer units substituted with a hydroxymethyl substituent with n=10 to 10,000 units.

4. The conductive polymer material of claim 1 further comprising alcohol functional groups.

5. A conductive film formed by a method comprising:

casting, on a substrate, a functionalized polymer solution comprising a conductive backbone of conjugated monomer units substituted with a hydroxymethyl substituent and nonconductive side chains; and cleaving the nonconductive side chains off of the conductive backbone to form the conductive film;

wherein:

the conductive film is insoluble in at least one solvent; and the conjugated monomer units substituted with a hydroxymethyl substituent in the conductive backbone have the structure of:

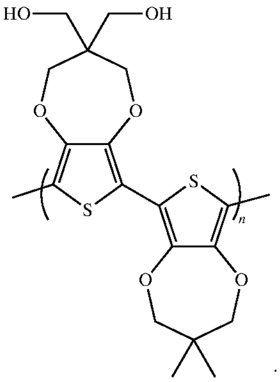

.

wherein n is from 10 to 10,000.

6. The conductive film of claim 5, wherein the conductive film has a conductivity from 10 S/cm to 100,000 S/cm.

7. The conductive film of claim 5, wherein the nonconductive side chains comprise ester functional groups.

8. The conductive film of claim 5, wherein the cleaving is selected from a group consisting of a hydrolysis reaction, thermal cleavage, and a photocleavage reaction.

9. The conductive film of claim 5, wherein the cleaving further comprises volumetrically contracting the conductive film.

10. The conductive film of claim 5, wherein the Seebeck coefficient of the conductive film is decreased when compared to the Seebeck coefficient of the functionalized polymer solution on the substrate.

* * * * *